United States Patent
Altonen et al.

(10) Patent No.: US 8,609,012 B2
(45) Date of Patent: Dec. 17, 2013

(54) SCALABLE INJECTION MOLDING SYSTEMS

(75) Inventors: Gene Michael Altonen, West Chester, OH (US); David Andrew Dalton, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 261 days.

(21) Appl. No.: 13/169,591

(22) Filed: Jun. 27, 2011

(65) Prior Publication Data

US 2011/0316196 A1 Dec. 29, 2011

Related U.S. Application Data

(60) Provisional application No. 61/359,561, filed on Jun. 29, 2010.

(51) Int. Cl.
*B29C 45/17* (2006.01)
*B29C 45/27* (2006.01)

(52) U.S. Cl.
USPC .................. 264/328.8; 425/190; 425/572

(58) Field of Classification Search
USPC ........ 264/328.1, 328.8; 425/182, 190, 192 R, 425/570, 572, 573
See application file for complete search history.

(56) References Cited

U.S. PATENT DOCUMENTS

| | | | | |
|---|---|---|---|---|
| 4,337,027 A * | 6/1982 | Montieth | ...................... | 425/562 |
| 5,334,006 A * | 8/1994 | Hepler et al. | .................. | 425/190 |
| 6,613,262 B1 | 9/2003 | Arend | | |
| 6,776,599 B2 * | 8/2004 | Street et al. | .................... | 425/116 |
| 6,960,072 B1 * | 11/2005 | Hepler | ........................... | 425/549 |
| 7,022,278 B2 * | 4/2006 | Colonico | .................... | 264/328.8 |
| 7,204,685 B1 * | 4/2007 | Crain et al. | .................... | 425/185 |
| 8,197,247 B2 * | 6/2012 | Lee | .............................. | 425/562 |
| 2006/0244178 A1 | 11/2006 | Armbruster | | |
| 2007/0190205 A1 | 8/2007 | Wimberger | | |

OTHER PUBLICATIONS

International Search Report mailed Jan. 16, 2012 for International Application Serial No. PCT/US2011/042118, 16 pages.

* cited by examiner

*Primary Examiner* — Jill Heitbrink
(74) *Attorney, Agent, or Firm* — Gary J. Foose

(57) ABSTRACT

Scalable injection molding systems comprise a molding press and at least one delivery system. Each delivery system comprises an injection unit and a manifold. The scalable injection molding system further comprises at least one molding face pair having a cavity face and an opposing core face. Each scalable injection molding system comprises at least one scalable system selected from the group consisting of a scalable face-number system with respect to numbers of active mold face pairs in the scalable injection molding system and a scalable cavitation system with respect to numbers of functional mold cavities on each mold face pair. Both the scalable face-number system and the scalable cavitation system allow the output of the scalable injection molding system to be increased or decreased according to needs of the operator, without requiring costly reconfiguration, retooling, replacement, or unnecessary duplication of standard mold components.

17 Claims, 18 Drawing Sheets

SCALABLE INJECTION MOLDING SYSTEMS

CROSS REFERENCE TO RELATED APPLICATIONS

This application claims the benefit of U.S. Provisional Application No. 61/359,561 filed Jun. 29, 2010.

TECHNICAL FIELD

The present invention relates to injection molding systems and, more particularly, to injection molding systems scalable with respect to numbers of molding face pairs, to numbers of cavitations per molding face pair, or to both.

BACKGROUND

Injection molding is a technology commonly used for high-volume manufacturing of parts made of meltable materials, most commonly of parts made of plastic. During any injection molding process, typically a melted (plasticized) resin, such as a plastic resin in the form of small beads, is forcefully injected into one or more mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel, called a runner, that directs the flow of the melted plastic though a feed gate and into the cavity. Thus, a typical injection molding cycle may comprise three basic operations: (1) heating the plastic in an injection unit to allow it to flow under pressure; (2) injecting the melted plastic into a mold cavity or cavities defined between two mold halves that have been closed and allowing the plastic to harden (cool) in the cavity or cavities while under pressure; and (3) opening the mold halves to cause the part to be ejected from the mold. A continuous molding process may comprise two or more injection molding cycles.

The two mold halves of an injection molding system typically are held together by machinery such as a hydraulic press. Generally connected to each mold half one or more molding face. Each mold face may be described, for example, as either a cavity plate or a core plate. The cavity plate may have defined in its surface one or more depressions in the shape of a top surface of a part to be molded. The core plate may have defined in its surface one or more protrusions, each corresponding to a depression in the cavity plate, in the shape of a bottom surface of a part to be molded. The depressions and protrusions are geometrically configured such that, when the two mold halves are brought together, the protrusions in the core plate extend into the depressions in the cavity plate so as to define a cavity between the cavity plate and the core plate. The number of cavities defined one or more pair of molding faces between a pair of mold halves shall be referred to as the "maximum cavitation" of the mold. The maximum cavitation of the mold also represents the maximum number of parts that can be produced per cycling of the two mold halves.

Injection molding systems also may be stacked, such that for any given cycle of the injection molding press, a plurality of pairs of molding faces are pressed together between the two mold halves simultaneously. For any given injection molding system, the number of pairs of molding faces operating at any stage or cycle during a continuous molding process to produce parts shall be referred to as the "face number" of the system, which alternatively may be represented using terms such as "single-face," "double-face," "6-face," or even "multi-face," for example.

An injection molding system can represent a large capital investment on the part of a manufacturer, in that complex machinery and control systems must be designed and installed to fulfill operational requirements, particularly with respect to production capacity. For example, injection molding systems may comprise as standard components the molding press itself, an injection screw, a mold mounting block, a heater, a cooling system, an ejector system, a hot runner system, a water connection, an air connection, a hydraulic connection, a limit switch connection, a basic insert connection, and a plug configuration box. These standard components represent the necessary capital investment even before a mold face can be designed, fabricated, installed, optimized, and placed into operation.

The disadvantage of high capital cost of an injection molding system is typically coupled with a disadvantageously limited flexibility of an established system. For example, systems are generally tailored specifically to operate with a set cavitation, with molds designed for one particular part, such that any change of the system may require either significant retooling or even complete rebuilding of the system. The molding press itself may have been designed to occupy a certain amount of floor space, and the halves of the mold press may have been configured to open only to a certain set width. These become critical issues for manufacturers whose volume of business may expand or contract significantly over any given period of time.

As a further illustration, consider a manufacturer who has invested in a single-face injection molding system with a cavitation of eight. If the manufacturer's business outgrows the capacity of this system, it is nearly impossible to convert the system to a single-face system with a cavitation of sixteen or to double-face system with two molds of cavitation eight, so as to double the maximum production volume. Thus, the manufacturer is forced to purchase a complete new system including all of the standard components. In one scenario, the manufacturer might purchase a new system identical to the old to avoid the technical risk of scaling the old system up or down to produce the new system. If demand for the product has not necessitated the resulting 100% increase in capacity, one of the systems will not be used to its full capacity for some time. But even if the 100% increase has occurred, two identical systems will be operating side by side with duplicated standard components and double the maintenance costs. In another scenario, the manufacturer might purchase a new system with double the capacity of the old system. Here, the old system may be scrapped, sold at a substantial loss, allowed to lie dormant, or at least be underused unless and until the demand for the manufacturer's product has increased another 50% to require the combined output of the old system and the new system. Even when demand does increase to that level, standard components will be duplicated.

Thus, there exists a need for scalable injection molding systems that can reduce wasted capital and maintenance expenditures on duplicated standard system components.

SUMMARY

This need is met by the embodiments of scalable injection molding systems described herein.

Embodiments described herein relate to scalable injection molding systems comprising a molding press and at least one delivery system. Each delivery system comprises an injection unit and a manifold. The scalable injection molding system further comprises at least one molding face pair having a cavity face and an opposing core face. Each scalable injection molding system comprises at least one scalable system selected from the group consisting of a scalable face-number system and a scalable cavitation system. Both the scalable face-number system and the scalable cavitation system allow the output of the scalable injection molding system to be increased or decreased according to needs of the operator, without requiring costly reconfiguration, retooling, replacement, or unnecessary duplication of standard mold components.

In some embodiments, the scalable injection molding system comprises a scalable face-number system. The scalable face-number system may comprise at least two opposing delivery systems feeding opposite sides of the molding press. An A-side molding plate is coupled to an A-side delivery system, and a B-side molding plate is coupled to a B-side delivery system. A rotatable intermediate assembly with at least two pairs of parallel opposing molding faces is positioned between the A-side molding plate and the B-side molding plate. The scalable face-number system comprises at least four configurations: a single-side stationary-intermediate configuration, a dual-side stationary-intermediate configuration, a single-side oscillating-intermediate configuration, and a dual-side oscillating-intermediate configuration. The ability to selectively configure a number of active plates in one scalable injection molding system represents one dimension of scalability.

In some embodiments, the scalable injection molding system comprises one or more scalable cavitation systems. Each scalable cavitation system comprises a pair of opposing molding faces divided into a plurality of cavity zones. Each cavity zone comprises a plurality of cavity positions connected to individual feed gates of an interchangeable multi-gate feed system associated with the cavity zone. Each cavity position is independently and interchangeably configurable as either a functional cavity position or a non-functional cavity position. Thus, by selecting the relative numbers of functional cavity positions and non-functional cavity positions, the operator can scale the output of each molding face pair in the scalable injection molding system with respect to its overall cavitation. The ability to scale output on a face-pair by face-pair basis also represents one dimension of scalability to the scalable injection molding system.

In further embodiments, the scalable injection molding system comprises both a scalable face-number system and one or more scalable cavitation systems. The scalable face-number system is scalable with respect to the number of active molding face pairs disposed between the opposing sides of the molding press. The scalable cavitation is scalable with respect to the numbers of functional mold cavities present on each of the active molding face pairs. As such, the scalable injection molding system having both a scalable face-number system and one or more scalable cavitation systems comprises two dimensions of scalability.

Further embodiments described herein relate to methods for reconfiguring scalable face-number systems and scalable cavitation systems to benefit from the scalability advantages associated with each system.

These and other features, aspects, and advantages of the present invention will become better understood with reference to the following description, appended claims, and accompanying drawings.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings, in which:

DETAILED DESCRIPTION

Figure 1:
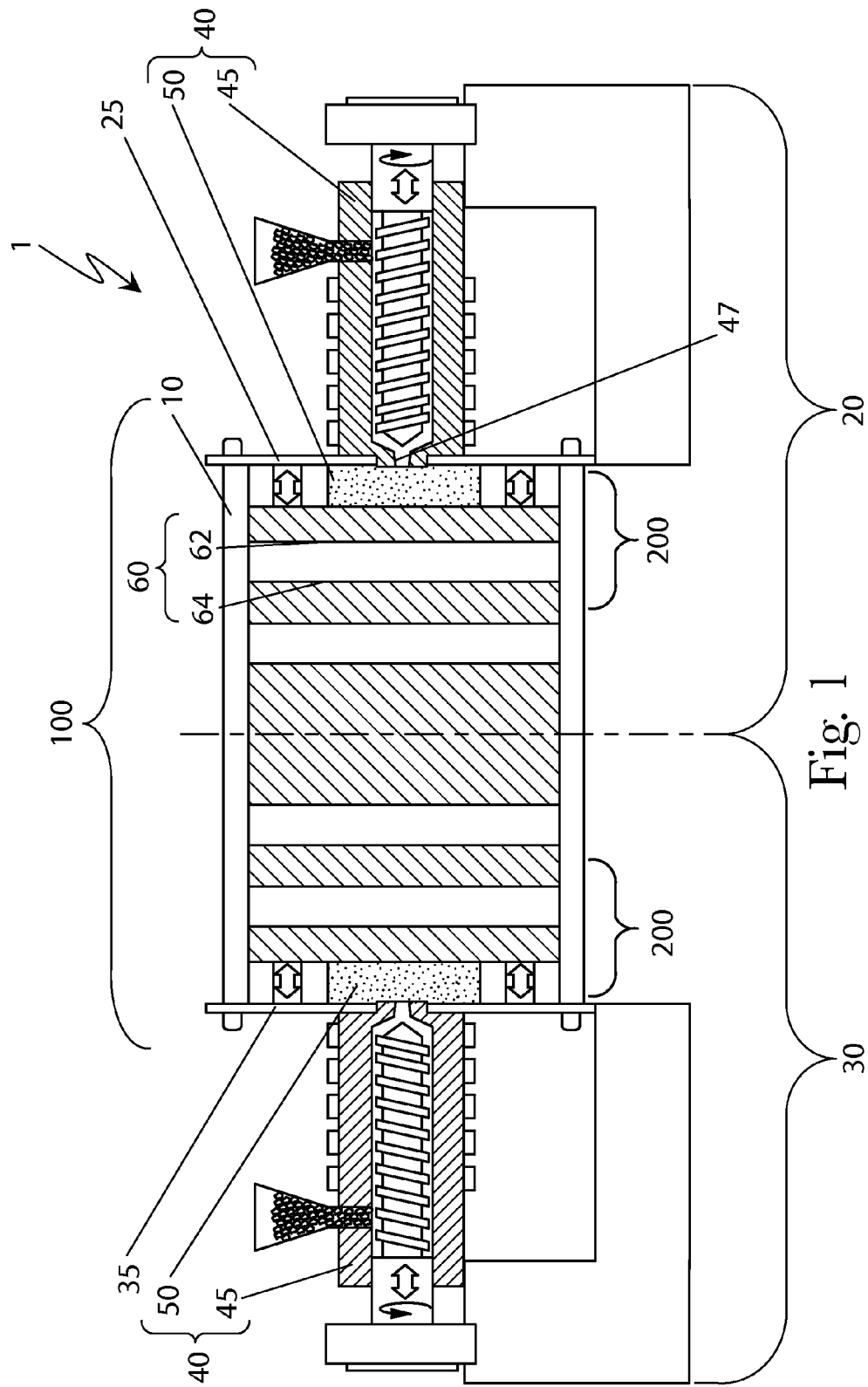
FIG. 1 shows an example scalable injection molding system pointing out with particularity the physical relationships of a scalable face-number system and a scalable cavitation system with respect to the entire scalable injection molding system.

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Terms that are not expressly defined in this patent are to be interpreted to the broadest scope of their plain or ordinary meaning. A term is considered expressly defined in this patent only if phrasing similar to "the term X means Y . . ." incorporates the term. It will be understood that an expressly defined term X is defined according to the provided definition Y unless otherwise specified.

No statement in any section of this patent outside the claims is to be construed as implied intent to limit the meaning of any term within the claims. Even if reference to a term outside the claims is consistent with only a single meaning of a term, it is not intended or implied that the term be limited to the single meaning when the term is recited within a claim. In such instances, use of the single meaning outside the claims is intended for the sake of clarity only.

Unless a claim limitation is defined by reciting the word "means" and a function, without the recital of any structure, it is not intended that the scope of the claim limitation be interpreted in accordance with 35 U.S.C. §112, sixth paragraph.

No term is intended to be essential to the present invention unless so stated. Furthermore, terms such as "preferably," "generally," "commonly," and "typically" are not intended to limit the scope of the claimed invention or to imply that certain features are critical, essential, or even important to the structure or function of the claimed invention. Rather, these terms are intended only to highlight alternative or additional features that may or may not be utilized in a particular embodiment of the present invention.

For quantities, use of the term "substantially" is intended in consideration that quantitative comparisons, values, measurements, or other representations possess inherent degrees of uncertainty. In this sense, "substantially" broadens the scope of quantities to encompass values within the inherent margin of error for measuring or determining the quantities. The term "substantially" also is utilized to represent the degree by which a quantitative representation may vary from a stated reference without resulting in a change in the basic function of the subject matter at issue.

Unless otherwise indicated, all numbers expressing quantities as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

References herein to the terms "cavity" and "core" are intended solely as a means to distinguish pairs of opposing parts and are not to be construed as implying that a part designated as a "core" must fit into a corresponding part designated as a "cavity." Rather, it will be understood and apparent that a part described as a "core" may in fact be a "cavity" according to the commonly-understood meaning, provided that the corresponding part described as a "cavity" is in fact a "core" according to the commonly-understood meaning. In such a situation, the so-called cavity may in fact fit inside the so-called core. In any respect, unless explicitly stated or clearly erroneous to presume so, every instance of the term "cavity" in the following description may be replaced with the term "core," and every instance of the word "core" may be replaced with the term "cavity."

Referring to FIG. 1, an example embodiment of a scalable injection molding system 1 is depicted. The scalable injection molding system 1 comprises a molding press 10 having an A-side wall 25 on an A-side 20 of the molding press 10 and a B-side wall 35 on a B-side 30 of the molding press 10. The B-side 30 is opposite the A-side 20. The scalable injection molding system 1 further comprises at least one delivery system 40 comprising an injection unit 45 coupled to the molding press 10. Though scalable injection molding system 1 is shown with two delivery systems 40, the scalable injection molding system 1 is by no means limited to two delivery systems 40 and may have only one delivery system 40 or three or more delivery systems, depending on the needs of the user to increase the potential for scalability of the scalable injection molding system 1. The injection unit 45 is operable to deliver molten material 47 to a manifold 50 in fluid communication with the injection unit 45. The injection unit 45 may deliver the molten material 47 to the manifold 50 at an elevated pressure. During operation of the molding press 10 at least one molding face pair 60 presses together a cavity face 62 and an opposing core face 64 of the molding face pair 60.

Figure 4A:
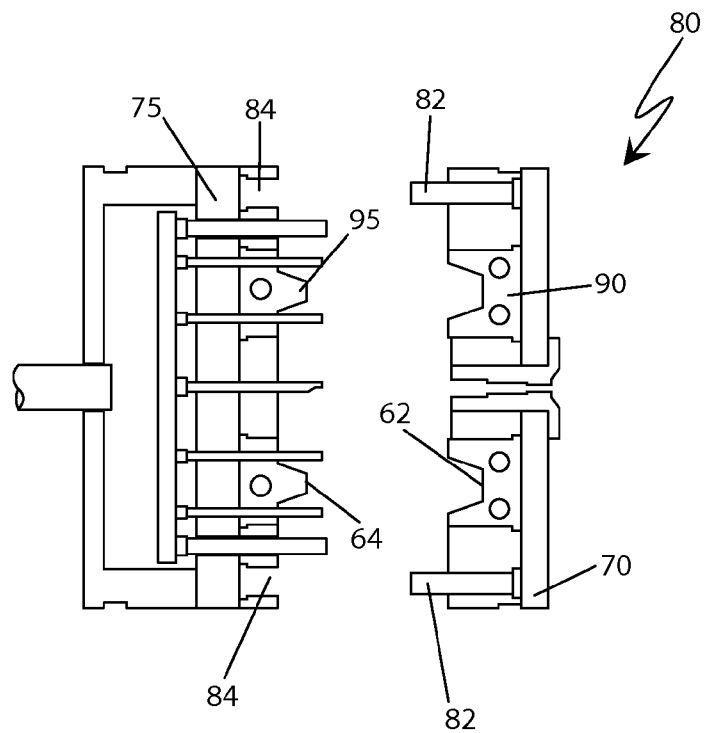
FIG. 4A depicts the structural components of a single mold cavity.

A detailed view highlighting common characteristics of a mold-cavity assembly 80 is shown in FIG. 4A. The mold-cavity assembly 80 shown in FIG. 4A is selected only to show common features of mold cavities to be described in further detail below, without intent to limit embodiments of scalable injection molding systems to any particular mold shape or configuration. It will be understood that mold cavities may be constructed according to many configurations known by those skilled in the art. The mold-cavity assembly 80 may comprise a cavity plate 70 and a core plate 75. A cavity insert 90 is attached to the cavity plate 70, and a core insert 95 is attached to the core plate 75. The cavity plate 70 has a cavity face 62 with a surface defining depressions corresponding to the surface contour of one side of a part to be molded. The core plate 75 has a core face 64 with a surface defining protuberances corresponding to the surface contour of an opposite side of the part. The mold-cavity assembly 80 may comprise one or more guidance pins 82 attached to one of the plates so that when the cavity plate 70 and the core plate 75 are pressed together the one or more guidance pins 82 slide into one or more corresponding guidance holes 84 on the opposite plate. The mold-cavity assembly 80 may be in fluid communication with a delivery system (not shown) through an opening (not shown) on cavity plate 70 or the core plate 75.

Referring back to FIG. 1, the scalable injection molding system 1 further comprises at least one scalable system selected from the group consisting of a scalable face-number system 100 and a scalable cavitation system 200.

As used herein, the term "face number" with respect to any given injection molding system refers to the number of pairs of molding faces operating at any stage or cycle during a continuous molding process to produce parts. The face number of a system may be represented using terms such as "single-face," "double-face," "6-face," or even "multi-face," for example. The face number of the injection molding system may be greater than the number of pairs of molding faces actually present in the injection molding system, particularly if certain pairs of mold faces are designated as "inactive" during some cycles of the continuous injection molding process and "active" during other cycles.

As used herein, the term "scalable face-number system" refers to a system comprising two or more molding face pairs that is selectively configurable to operate with a face-number ranging from one to the number of molding face pairs without a need to replace or significantly re-tool or reconfigure the standard components of the injection molding apparatus. As used herein, "selectively configurable" means that the number of molding faces to be active during a molding cycle may be selected by the operator of the molding apparatus by simple means, such as by activating or deactivating various components on the molding apparatus. As will be described in greater detail below, the scalable face-number system 100 imparts a first dimension of scalability in the scalable injection molding system 1 with respect to the number of molding face pairs 60 that are active for producing parts. For this reason, the scalable face-number system 100 is indicated on FIG. 1 with relation to all molding face pairs 60 between two delivery systems 40.

As used herein, the term "scalable cavitation system" refers to a system incorporated into at least one individual molding face pair having a defined number of cavity positions, whereby the individual molding face pair is independently and interchangeably configurable to produce any number of parts from one to the maximum cavitation of the individual molding face pair without a need to replace or significantly re-tool or reconfigure the standard components of the injection molding apparatus. As used herein, "independently and interchangeably configurable" means that one or more cavities may be changed from an inactive state to an active state, or from an active state to an inactive state, so as to increase or decrease the number of parts produced in the course of a continuous injection molding process, without regard to whether any other particular cavity positions are functional or non-functional.

The scalable cavitation system 200 imparts a second dimension of scalability in the scalable injection molding system 1, but with respect to the molding face pairs 60 themselves. The scalable cavitation system 200 may impart the scalability to a single pair of molding faces or to all pairs of molding faces in fluid communication with exactly one delivery system. As such, the scalable injection molding system 1 may comprise both a scalable face-number system 100 and one or more scalable cavitation systems 200. The scalable injection molding system 1 may comprise a number of scalable cavitation systems up to the number of delivery systems 40 present in the scalable injection molding system 1.

Figure 2:
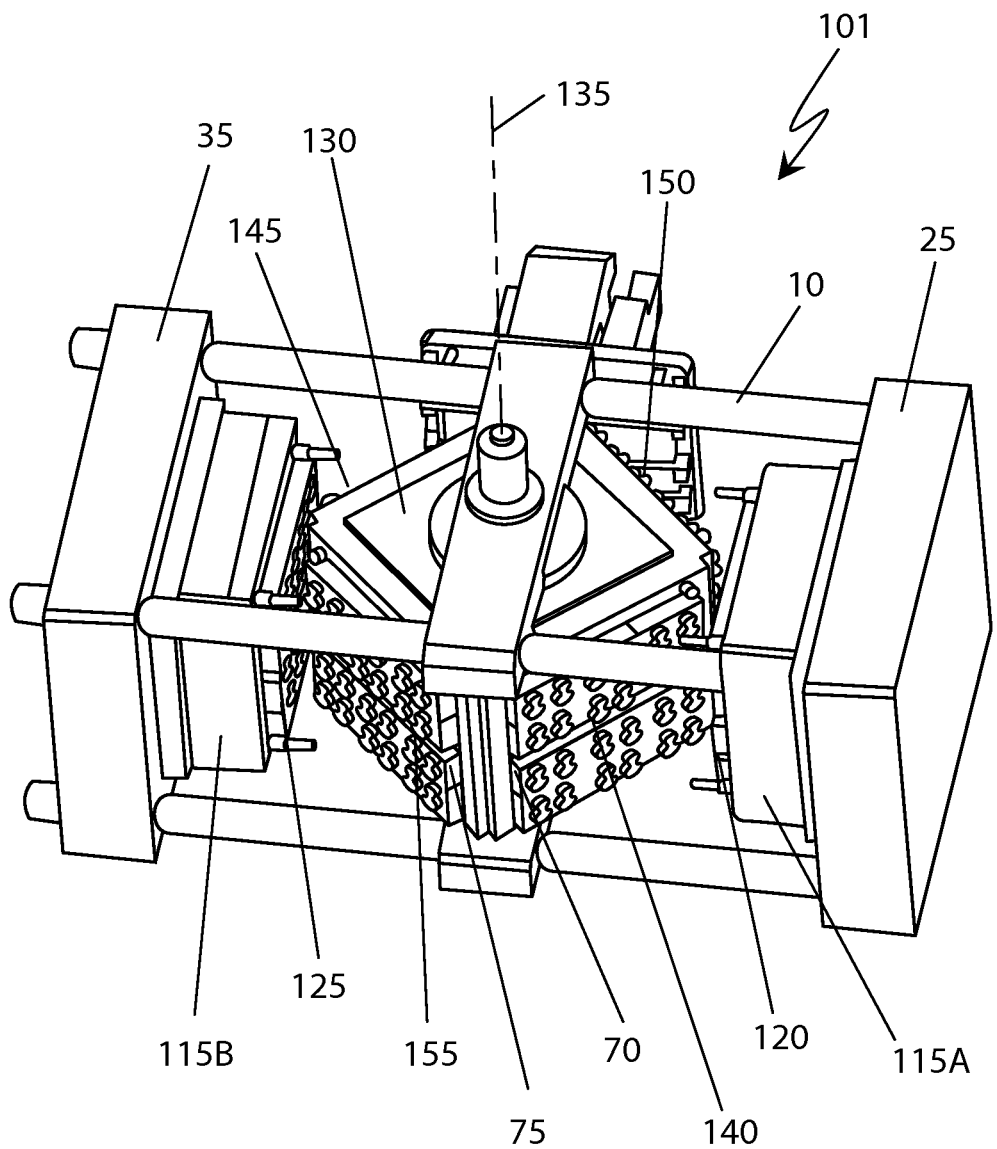
FIG. 2 depicts a scalable face-number system according to embodiments described herein.

Referring to FIG. 2, an example embodiment of a scalable face-number system is depicted. The scalable face-number system in FIG. 2 is configured as a single-intermediate scalable face-number system 101. The single-intermediate scalable face-number system 101 comprises an A-side delivery system coupled to the A-side wall 25 and having an A-side injection unit (not shown) in fluid communication with an A-side manifold 115A. A B-side delivery system is coupled to the B-side wall 35 and has a B-side injection unit (not shown) in fluid communication with a B-side manifold 115B. An A-side molding plate 120 is directly coupled to the A-side manifold 115A and defines an A-side molding face facing the B-side wall 35 of the molding press 10. A B-side molding face 125 is directly coupled to the B-side manifold and defines B-side molding face facing the A-side wall 25 of the molding press 10.

Each scalable face-number system comprises at least one intermediate assembly positioned between the A-side molding face 120 and the B-side molding face 125, and the at least one intermediate assembly comprises a rotatable intermediate assembly 130. Referring to FIG. 2, in the single-intermediate scalable face-number system 101 the rotatable intermediate assembly 130 is disposed between the A-side molding face 120 and the B-side molding face 125 and is operable to rotate about a rotational axis 135. Rotational axis 135 is parallel to the A-side molding face 120. The rotatable intermediate assembly 130 comprises at least two pairs of parallel molding faces, as described below in further detail. Each pair of parallel molding faces comprises an A-side opposing molding face and a B-side opposing molding face. On the rotatable intermediate assembly 130 in FIG. 2, the pairs of parallel molding faces are shown as: (1) a first pair consisting of a first A-side opposing molding face 140 and a first B-side opposing molding face 145; and (2) a second pair consisting of second A-side opposing molding face 150 and second B-side opposing molding face 155. Each molding face comprises one or more cavity positions or core positions that may be inactive or active, as described in greater detail below. The active cavity positions may be occupied with cavity plates, and the active core positions may be occupied with core plates. For example, first A-side opposing molding face 140 is shown with cavity plates 70 engaged into the molding face, representing twelve cavity positions Likewise, the second B-side opposing molding face 155 is shown having core plates 75 engaged into the molding face, representing twelve core positions. Though the rotatable intermediate assembly 130 shown in FIG. 2 has exactly two pairs of parallel faces and is configured as a rectangular prism or cube, it is contemplated that other geometric solids such as hexagonal or octagonal prisms may be used.

Figure 3A:
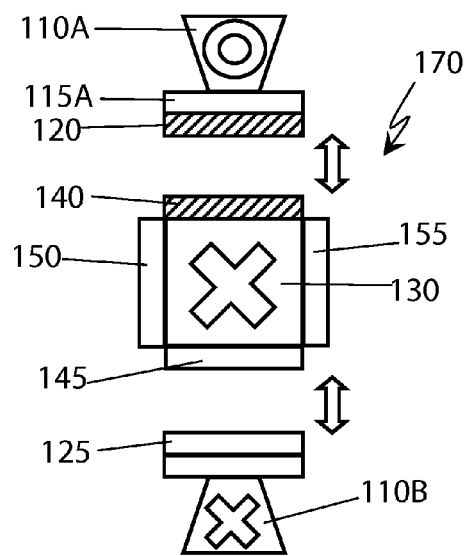
FIG. 3A depicts a first configuration of the scalable face-number system shown in FIG. 2.
Figure 3B:
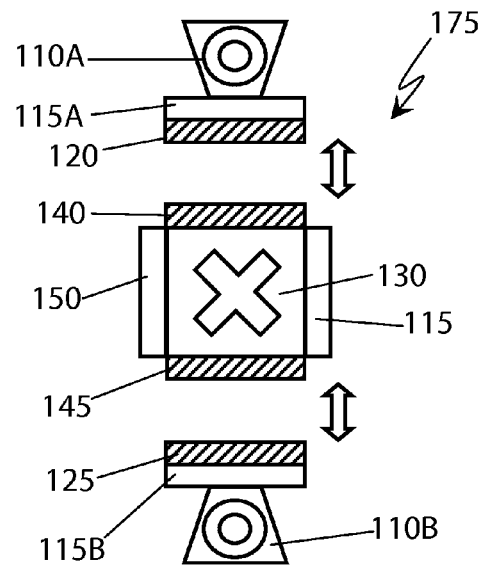
FIG. 3B depicts a second configuration of the scalable face-number system shown in FIG. 2.
Figure 3C:
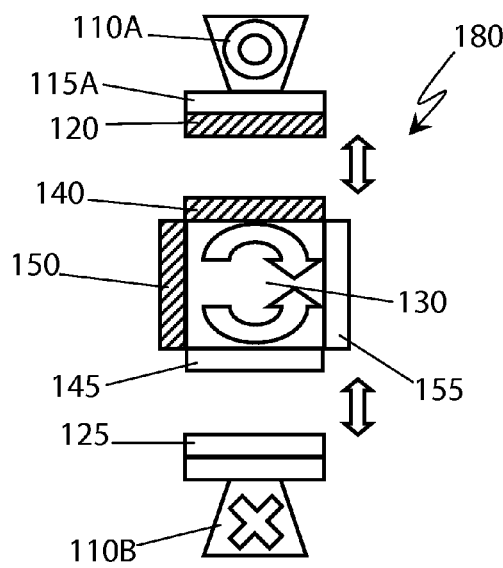
FIG. 3C depicts a third configuration of the scalable face-number system shown in FIG. 2.
Figure 3D:
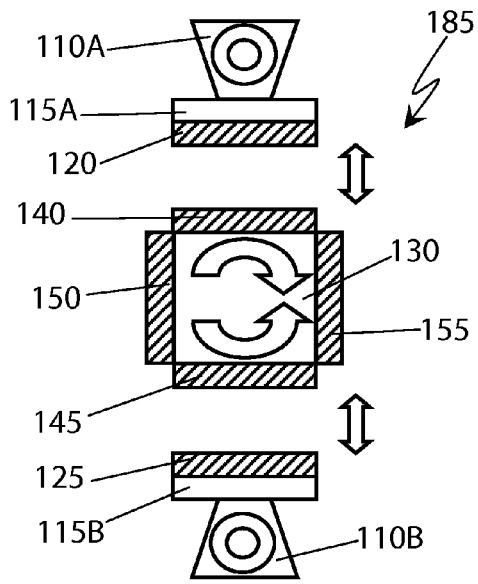
FIG. 3D depicts a fourth configuration of the scalable face-number system shown in FIG. 2.

A scalable injection molding system 1 comprising a scalable face-number system 100 may be selectively configurable in at least four configurations. For example, the single-intermediate scalable face-number system 101 is selectively configurable in the four configurations shown in FIGS. 3A-3D. FIG. 3A depicts a single-side stationary-intermediate configuration 170. FIG. 3B depicts a dual-side stationary-intermediate configuration 175. FIG. 3C depicts a single-side oscillating-intermediate configuration 180. FIG. 3D depicts a dual-side oscillating-intermediate configuration 185.

As used herein, the term "active molding face" means that the molding face is parallel to an adjacent opposing molding face, that both the molding face and the adjacent opposing molding face are equipped with one or more core or cavity inserts, as applicable to a core face or a cavity face respectively, and that during a molding cycle molten material is injected into the cavities formed between the molding face and a mating molding face to form a molded part. As used herein, the term "inactive molding face" refers to a molding face that is at least one of the following: (1) not equipped with any core or cavity inserts capable of producing a molded part, such as a mold face having all with cavity positions filled with plugs or any other device known in the art, for example; or (2) a blank plate having no features conducive to molding parts but left in the molding press to maintain proper balance or pressure; or (3) a molding face having one or more core or cavity inserts that mate with an opposing molding face to form one or more mold cavities, but with none of the mold cavities being in fluid communication with an operational delivery system; or (4) not parallel to an adjacent opposing molding face. Both terms "active molding face" and "inactive molding face" may be used with respect to a single molding cycle or with respect to a continuous molding process comprising a plurality of molding cycles. A molding face is "active" during a continuous molding process and, thereby, counts toward the face number of the injection molding system during the continuous molding process, if the molding face is an active molding face during at least one molding cycle in the continuous molding process, even if the molding face is not an active molding face during all molding cycles of the continuous molding process.

In the single-side stationary-intermediate configuration 170 shown in FIG. 3A, the single-intermediate scalable face-number system 101 operates as a single-face system. The A-side injection unit 110A is operational to feed material into the A-side manifold 115A and the A-side molding face 120. The B-side injection unit 110B is turned off. The rotatable intermediate assembly 130 is held stationary during all molding cycles. As such, only A-side molding face 120 and first A-side opposing molding face 140 on the rotatable intermediate assembly 130 are active molding faces. Each of the B-side molding face 125, the first B-side opposing molding face 145, the second A-side opposing molding face 150, and the second B-side opposing molding face 155 are inactive molding faces.

In the dual-side stationary-intermediate configuration 175 shown in FIG. 3B, the single-intermediate scalable face-number system 101 operates as a double-face system. Here, both the A-side injection unit 110A and the B-side injection unit 110B are operational. The A-side injection unit 110A is operational to feed material into the A-side manifold 115A and the A-side molding face 120. The B-side injection unit 110B is operational to feed material into the B-side manifold 115B and the B-side molding face 125. The rotatable intermediate assembly 130 is held stationary during all molding cycles. Thus, the A-side molding face 120 and first A-side opposing molding face 140 on the rotatable intermediate assembly 130 are active molding faces, and the B-side molding face 125 and first B-side opposing molding face 145 on the rotatable intermediate assembly 130 are active molding faces.

In the single-side oscillating-intermediate configuration 180 shown in FIG. 3C, the single-intermediate scalable face-number system 101 also operates as a double-face system, but with the advantage of a rotatable intermediate assembly 130 that oscillates between molding cycles. The oscillation of the rotatable intermediate assembly 130 is described in greater detail below. In the single-side oscillating-intermediate configuration 180, the A-side injection unit 110A is operational to feed material into the A-side manifold 115A and the A-side molding face 120, but the B-side injection unit 110B is turned off. During a continuous molding process comprising alternating first molding cycles and second molding cycles, the A-side molding face 120 is always an active molding face. The first A-side opposing molding face 140 on the rotatable intermediate assembly 130 is an active molding face during the first molding cycle and an inactive molding face during the second molding cycle. The second A-side opposing molding face 150 is an inactive molding face during the first molding cycle and an active molding face during the second molding cycle. In the first molding cycle, parts are produced between the A-side molding face 120 and the first A-side opposing molding face 140. Thereupon, the rotatable intermediate assembly 130 is rotated in a first direction. Then, in the second molding cycle, parts are produced between the A-side molding face 120 and the second A-side opposing molding face 150. The rotatable intermediate assembly 130 is rotated in a second direction opposite the first direction, and another first molding cycle can begin. During the entire continuous molding process, each of the B-side molding face 125, the first B-side opposing molding face 145, and the second B-side opposing molding face 155 are inactive molding faces.

In the dual-side oscillating-intermediate configuration 185 shown in FIG. 3D, the single-intermediate scalable face-number system 101 operates as a four-face system with the added advantage of a rotatable intermediate assembly 130 that oscillates between molding cycles. The face number of the dual-side oscillating-intermediate configuration 185 is four, because during a continuous molding process four unique molding face pairs are active during one or more molding cycles of the continuous molding process, even though during any one cycle only two molding face pairs are used to produce parts. Here, both the A-side injection unit 110A and the B-side injection unit 110B are operational. The A-side injection unit 110A is operational to feed material into the A-side manifold 115A and the A-side molding face 120. The B-side injection unit 110B is operational to feed material into the B-side manifold 115B and the B-side molding face 125. During a continuous molding process comprising alternating first molding cycles and second molding cycles, both the A-side molding face 120 and the B-side molding face 125 are always active molding faces. In the first molding cycle, the first A-side opposing molding face 140 and the first B-side opposing molding face 145 are active molding faces, but the second A-side opposing molding face 150 and the second B-side opposing molding face 155 are inactive molding faces. Thus, in the first molding cycle, parts are produced between the A-side molding face 120 and the first A-side opposing molding face 140, and also between the B-side molding face 125 and the first B-side opposing molding face 145. Thereupon, the rotatable intermediate assembly 130 is rotated in a first direction. In the second molding cycle, the second A-side opposing molding face 150 and the second B-side opposing molding face 155 are active molding faces, but the first A-side opposing molding face 140 and the first B-side opposing molding face 145 are inactive molding faces. Thus, in the second molding cycle, parts are produced between the A-side molding face 120 and the second A-side opposing molding face 150, and also between the B-side molding face 125 and the second B-side opposing molding face 155. The rotatable intermediate assembly 130 is rotated in a second direction opposite the first direction, and another first molding cycle can begin.

The availability of four configurations of the single-intermediate scalable face-number system 101 to tailor the molding process to output needs. For example, the single-side stationary-intermediate configuration 170 has the lowest output per unit of time and may be appropriate during initial phases of product development when demand is not exceptionally high. The dual-side stationary-intermediate configuration 175 produces double the number of parts in a given time period and also allows the flexibility to produce two different parts simultaneously.

The oscillation of the rotatable intermediate assembly 130 in the single-side oscillating-intermediate configuration 180 and the dual-side oscillating-intermediate configuration 185 further increases part output by doubling the face numbers of the respective configurations in which the rotatable intermediate assembly is fixed. In particular, the benefit to be realized is that of decreased cycling times. Typically in injection molding processes, the mold press is opened and a part is ejected. The ejection make take several seconds, and the ejection must be complete before the mold can be closed to produce another batch of parts. However, when the rotatable intermediate assembly 130 oscillates, the ejection process can be made to occur on the one or more molding faces perpendicular to the A-side molding face 120 and the B-side molding face 125. Thereby, the ejection of a first batch of parts occurs simultaneously with the injection of a second batch of molten material into the closed cavities of the faces parallel to the A-side molding face 120 and the B-side molding face 125. Even if only a few seconds per cycle are saved, the total cost benefit over thousands of repeated cycles becomes substantial.

Figure 4B:
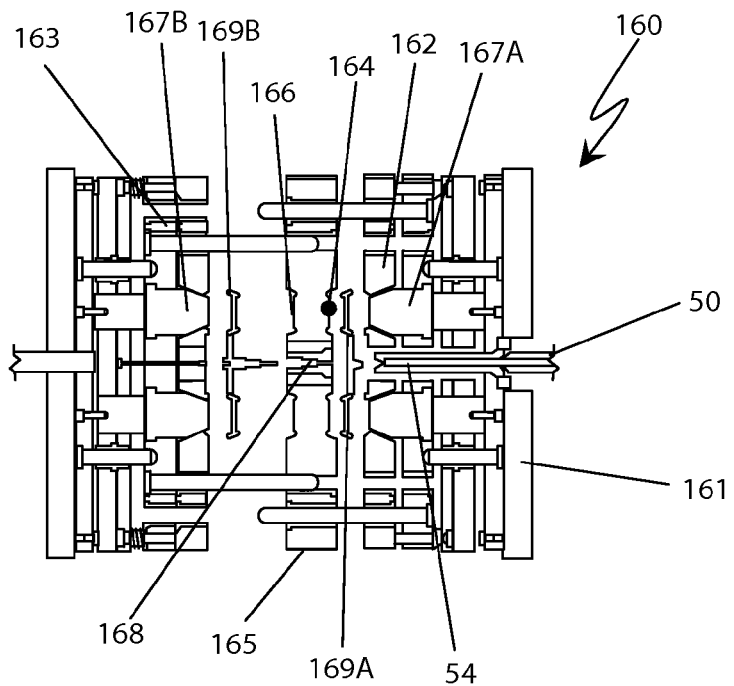
FIG. 4B depicts the structural components of a stacked mold cavity.

In further example embodiments, the scalable face-number system 100 may comprise additional molding faces including, for example, stacked configurations of molding faces or additional rotatable intermediate assemblies. An example of a stacked mold-cavity assembly 160 is shown in FIG. 4B. In the stacked mold-cavity assembly 160, a first molding face 162 is configured as a core plate with first core inserts 167A, and a second molding face 163 is configured also as a core plate with second core inserts 167B. Between the first molding face 162 and the second molding face 163 is an intermediate two-face assembly 165. The intermediate two-face assembly 165 has an A-side opposing intermediate face 164 and a B-side opposing intermediate face 166, both configured as cavity plates. An intermediate assembly pass-through 168 extends through the intermediate two-face assembly to provide a fluid communication between the A-side opposing intermediate face 164 and the B-side opposing intermediate face 166. When the molding press is closed, molten material is fed from the manifold 50 through feed gate 54 and intermediate assembly pass-through 168 to fill two separate cavities. Then, when the molding press is opened a first part 169A and a second part 169B are ejected from the two separate cavities.

Though the stacked mold-cavity assembly 160 is shown as configured to deliver two parts per mold-cavity assembly, it will be understood by those skilled in the art that stacked mold-cavity assemblies may be constructed to deliver any number of parts per mold-cavity assembly, for example, three parts, five parts, and even ten parts, within practical design constraints. Additional parts may be formed by adding further intermediate two-face assemblies between the first molding face 162 and the second molding face 163, each of the further intermediate assemblies having one or more intermediate assembly pass-though 168.

Figure 5:
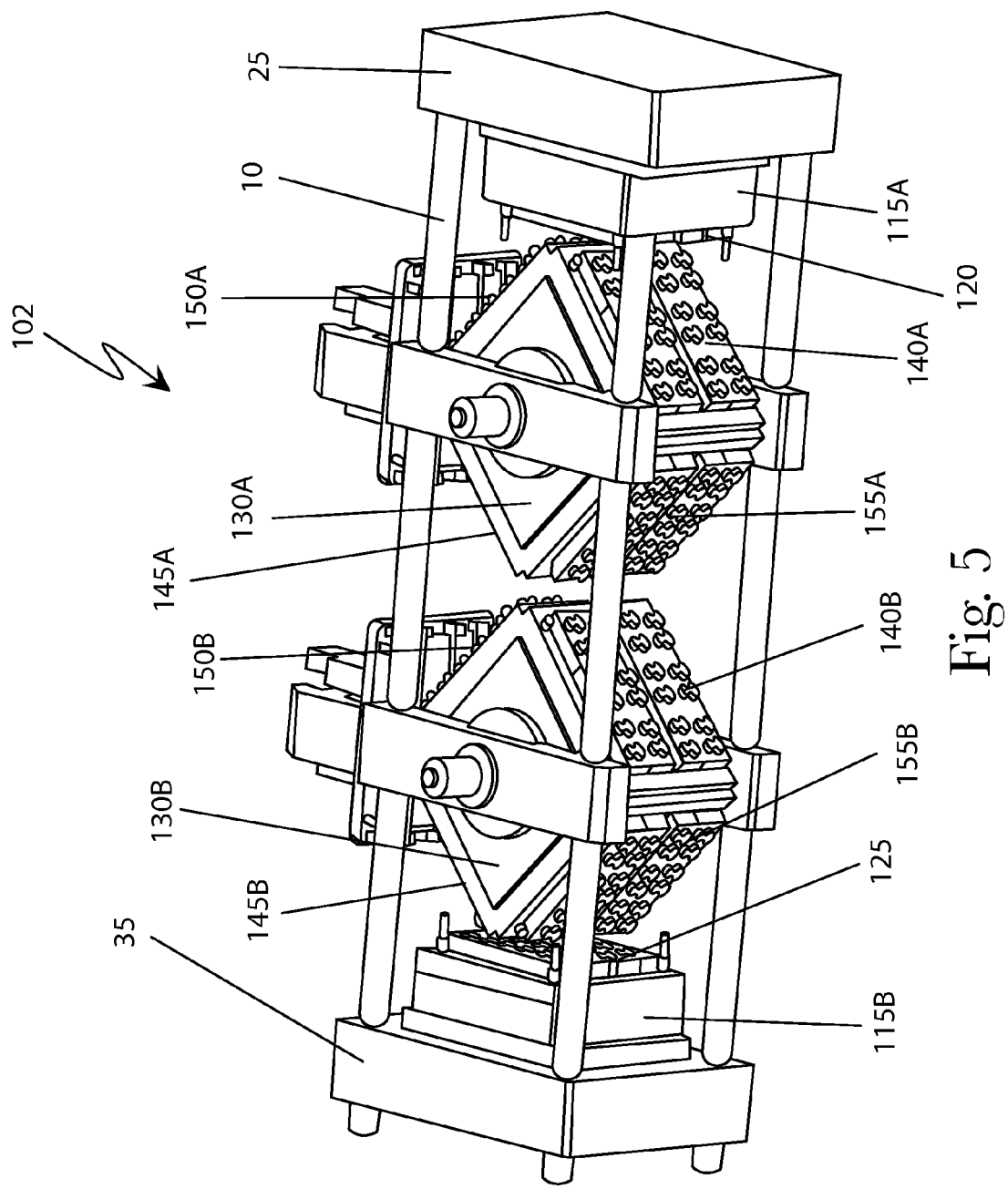
FIG. 5 depicts a further example of a scalable face-number system according to embodiments described herein.

In a further example embodiment, the scalable face-number system 100 may be configured as a double-intermediate face-scalable system 102 as shown in FIG. 5. The double-intermediate face-scalable system 102 comprises an A-side rotatable intermediate assembly 130A and a B-side rotatable intermediate assembly 130B between an A-side molding face 120 and a B-side molding face 125. An A-side manifold 115A provides molten material to the A-side molding face 120, and a B-side manifold 115B provides molten material to the B-side molding face 125.

As shown, the double-intermediate face-scalable system 102 may be configured to operate with a maximum face number of four. However, by adding connections operable to establish fluid communications through or around the A-side rotatable intermediate assembly 130A, the B-side rotatable intermediate assembly, or both, the double-intermediate face-scalable system 102 may be configured to operate with a maximum face number of six. The six-face system contemplates forming three parts simultaneously from three first pairs of molding faces in a first cycle, then forming three parts simultaneously from three second pairs of molding faces in a second cycle, for a total of six pairs of molding faces. When the six-face configuration is employed, during each closing of the molding press 10 effected by pressing the B-side wall 35 against the A-side wall 25, the A-side molding face 120 mates with a first A-side opposing molding face 140A of the A-side rotatable intermediate assembly 130A, the B-side molding face 125 mates with first B-side opposing molding face 145B of the B-side rotatable intermediate assembly 130B, and the second B-side opposing molding face 155A of the A-side rotatable intermediate assembly 130A mates with the first A-side opposing molding face 140B of the B-side rotatable intermediate assembly 130B. The face number of the double-intermediate face-scalable system 102 is scalable by choosing configurations, such as by selectively activating or deactivating the B-side injection unit, selectively rotating or holding stationary one or both of the intermediate assemblies, or selectively connecting or disconnecting any fluid communication between the two intermediate assemblies. At minimum, the double-intermediate face-scalable system 102 comprises the four configurations of the single-intermediate face-scalable system 101 (FIG. 2): a single-side stationary-intermediate configuration, a dual-side stationary-intermediate configuration, a single-side oscillating-intermediate configuration, and a dual-side oscillating-intermediate configuration.

Figure 6A:
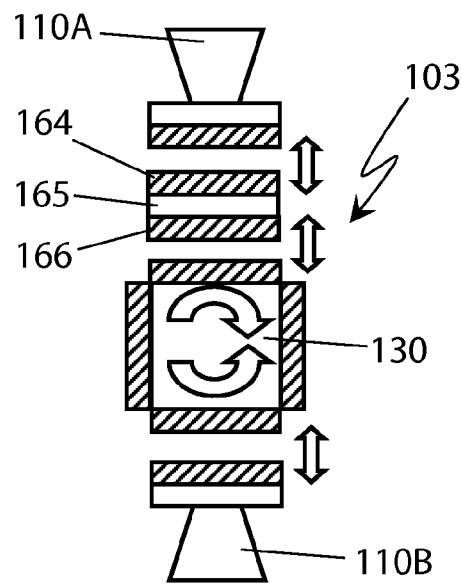
FIG. 6A depicts a further example of a scalable face-number system according to embodiments described herein.

Still further example embodiments of scalable face-number systems are shown in FIGS. 6A-6D. FIG. 6A shows a double-intermediate face-scalable system 103 having a rotatable intermediate assembly 130 and one intermediate two-face assembly 165. The intermediate two-face assembly 165 increases the maximum potential face number of any system by one, through the addition of two faces, an A-side opposing intermediate face 164 and a B-side opposing intermediate face 166. As such, the double-intermediate face-scalable system 103 may be configured to operate with a face number of up to five. The face number is scalable by choosing configurations, such as by selectively activating or deactivating one of the injection units, or by selectively rotating or holding stationary the rotatable intermediate assembly 130. Thereby, six configurations are possible: (1) A-on/B-on/oscillate for a face number of five; (2) A-on/B-on/stationary for a face number of three; (3) A-on/B-off/oscillate for a face number of four; (4) A-on/B-off/stationary for a face number of two; (5) A-on/B-off/oscillate for a face number of two; and (6) A-on/B-off/stationary for a face number of one. Each of these six configurations belongs to exactly one of the four configurations defined above: namely, (4) and (6) are single-side stationary-intermediate configurations; (2) is a dual-side stationary-intermediate configuration; (3) and (5) are single-side oscillating-intermediate configurations; and (1) is a dual-side oscillating-intermediate configuration.

Figure 6B:
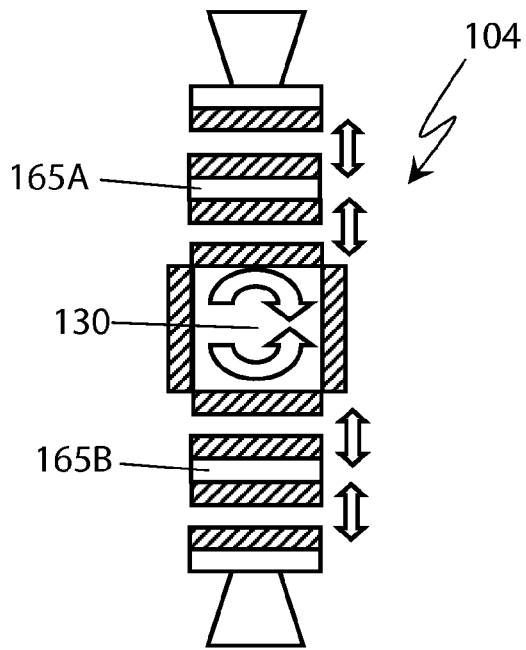
FIG. 6B depicts a further example of a scalable face-number system according to embodiments described herein.

FIG. 6B shows a triple-intermediate scalable face-number system 104 having a rotatable intermediate assembly 130, a first two-face intermediate assembly 165A, and a second two-face intermediate assembly 165B, such that the second two-face intermediate assembly 165B is on the opposite side of the rotatable intermediate assembly 130 from the first two-face intermediate assembly 165A. The triple-intermediate scalable face-number system 104 may be configured to operate with a face number of up to six.

Figure 6C:
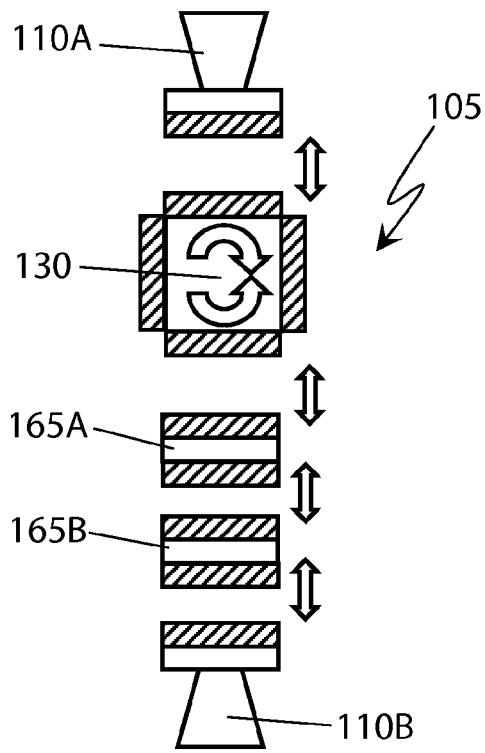
FIG. 6C depicts a further example of a scalable face-number system according to embodiments described herein.

FIG. 6C shows a triple-intermediate scalable face-number system 105 having a rotatable intermediate assembly 130, a first two-face intermediate assembly 165A, and a second two-face intermediate assembly 165B, such that the second two-face intermediate assembly 165B is on the same side of the rotatable intermediate assembly 130 as the first two-face intermediate assembly 165A. The triple-intermediate scalable face-number system 105 may be configured to operate with a face number of up to six also. However, deactivation of the A-side injection unit 110A decreases the face number by one or two, depending on the rotation status of the rotatable intermediate assembly 130, but deactivation of the B-side injection unit 110B decreases the face number by three or four, depending on the rotation status of the rotatable intermediate assembly 130.

Figure 6D:
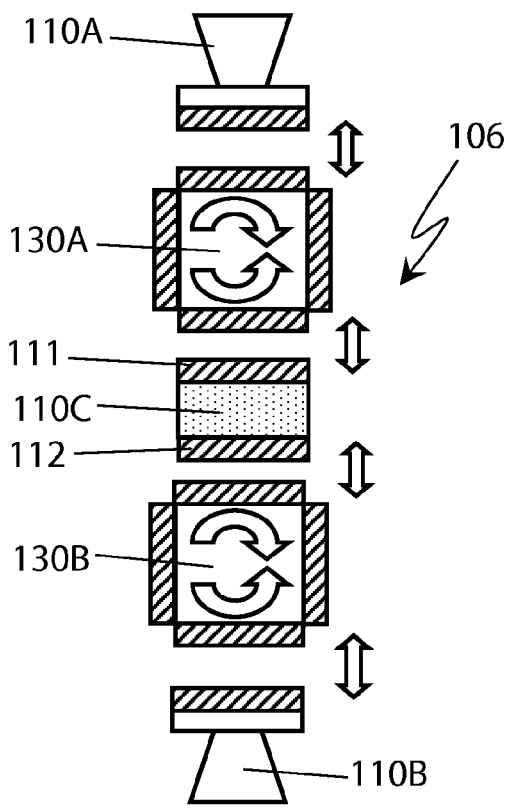
FIG. 6D depicts a further example of a scalable face-number system according to embodiments described herein.

FIG. 6D shows a triple-intermediate scalable face-number system 106 having an a-side rotatable intermediate assembly 130A, a B-side rotatable intermediate assembly 130B, and a center injection unit 110C in addition to the A-side injection unit 110A and the B-side injection unit 110B. The center injection unit 110C may be configured to feed molten material to A-side center molding face 111 and B-side center molding face 112, for example, through one or two manifolds (not shown) not in fluid communication with the A-side injection unit 110A or the B-side injection unit 110B. Furthermore, the center injection unit 110C may be configured to move with the molding press as the molding press opens or closes. As shown, the triple-intermediate scalable face-number system 106 may be configured to operate with a face number of up to eight.

It will be apparent to the person having ordinary skill in the art that numerous variations and modifications of the embodiments of scalable face-number systems a described above. The specific embodiments described above are intended to illustrate various possibilities without intent to limit the scalable face-number system to any specific configuration.

Referring back to FIG. 1, the at least one scalable system of the scalable injection molding system 1 may comprise a scalable cavitation system 200. An example embodiment of a scalable cavitation system 200 is depicted as first example scalable cavitation system configuration 201 in FIG. 7. The first example scalable cavitation system configuration 201 is presented in a minimal form intended to illustrate the various components common to any scalable cavitation system and is not intended to limit scalable cavitation systems to any particular mechanical or geometric configuration. In light of the present description, it will be readily understood by persons having ordinary skill in the art that additional scalable configurations are possible having varying degrees of complexity.

The first example scalable cavitation system configuration 201 comprises a cavity plate 210 having defined on a first molding face 220 at least two non-overlapping cavity zones. As a non-limiting example, cavity plate 210 has four cavity zones 230, 230A, 230B, and 230C, arranged as rectangles on a cavity plate 210 that is rectangular. But depending on production requirements and the dimensions of the parts to be produced per molding cycle, the cavity plate 210 may have, for example, at least four, at least six, at least eight, from two to twenty-four, from two to thirty, or any technically feasible number of cavity zones 230. To note, description herein with respect to cavity zone 230 is applies to all cavity zones in general, whereas description with respect to cavity zones 230A, 230B, and 230C is intended to illustrate a particular nuance of the cavity zones specifically depicted in FIG. 7.

Each cavity zone 230 has defined therein a plurality of cavity positions 240, and each cavity position 240 is independently and interchangeably configurable as either a functional cavity position 242 (represented by clear ovals) or a non-functional cavity position 244 (represented by hatched ovals).

As used herein, the term "cavity position" refers to a physical location suitable for a mold cavity and does not imply anything with regard to the structure present at the physical location.

As used herein, the term "functional cavity position" means that the cavity position is occupied by structural components such as a cavity insert, for example, and that the structural components are in fluid communication with the manifold. The term "non-functional cavity position" means that the cavity position meets one or more of the following descriptions: (1) not occupied by a cavity insert or any other structural component capable of producing a molded part; (2) occupied by a featureless component such as a blank plate, a rubber plug, or an air gap; or (3) occupied by a cavity insert or other structural component capable of producing a molded part, but the structural component is not in fluid communication with the manifold, either because no physical connection is present or because a physical connection is present but is actuated to an off-state, such as a physical connection closed off by a valve or other actuating means.

The terms "core position," "functional core position," and "non-functional core position" are used analogously to their respective counterparts.

The term "independently and interchangeably configurable," in view of the definition already provided above, implies that each cavity position 240 or each core position 270 is reconfigurable as functional or non-functional, as necessary or desired according to specified requirements of the operator, particularly with regard to production volume, for example, without replacement, significant re-tooling, or significant reconfiguration of the manifold 50 or any standard components of the molding press 10 (see FIG. 1).

Figure 7:
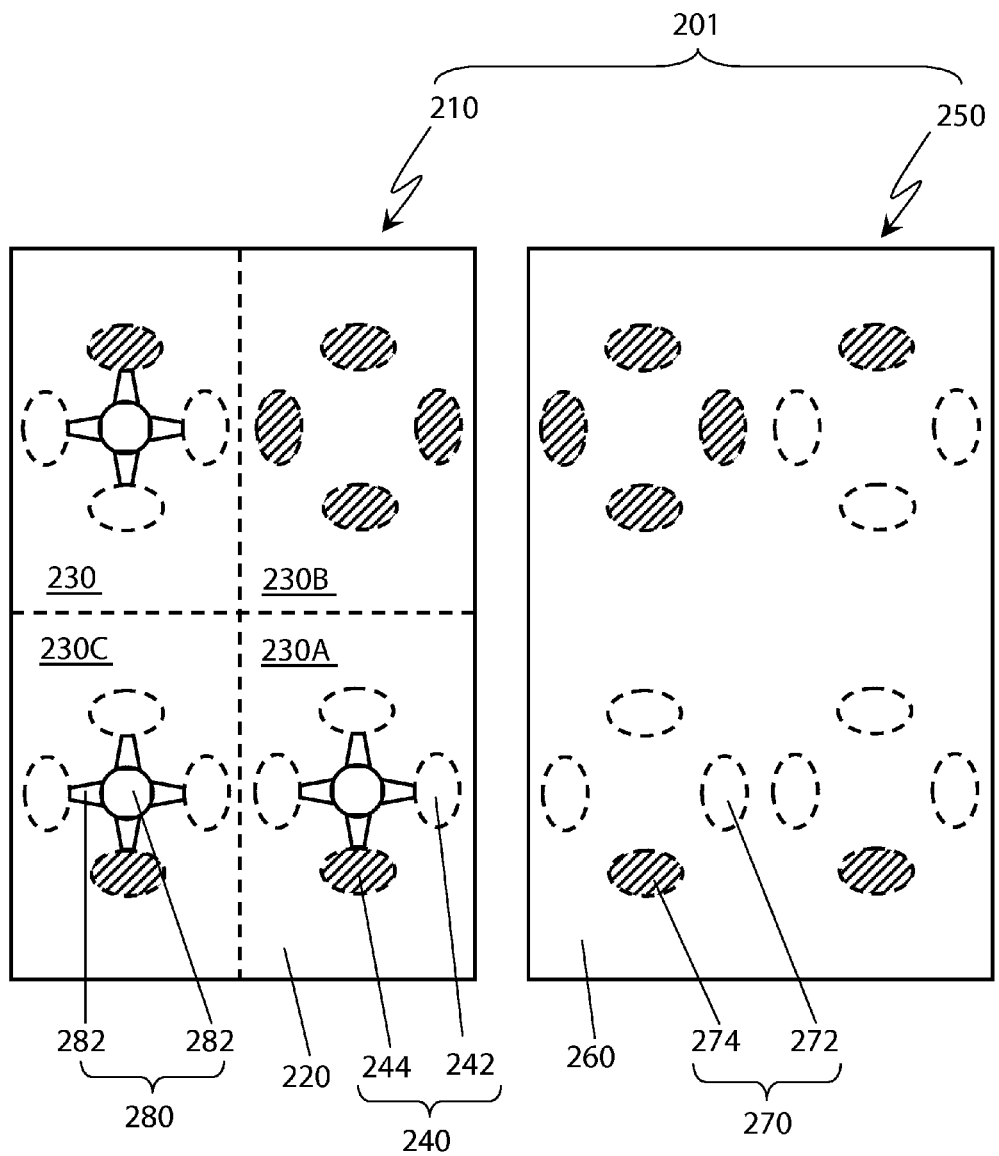
FIG. 7 is a general depiction of the structural components of a scalable cavitation system according to embodiments described herein.

It will be understood that at least one cavity position 240 on the first molding face 220 must be configured as a functional cavity position 242 during any given molding cycle to produce any parts. Preferably, at least one cavity position 240 in each cavity zone 230 may be configured as a functional cavity position 242. More preferably, each cavity zone 230 may comprise the same number of cavity positions 240 configured as functional cavity positions 242 as all other cavity zones during any given molding cycle. Also more preferably, the cavity positions 240 may be configured as functional cavity positions 242 in a manner that results in a balanced flow of molten material in each cavity zone 230, across on the first molding face 220 as a whole, or, most preferably, both in each cavity zone 230 and across the first molding face 220 as a whole. To note, FIG. 7 is not intended to illustrate any of these preferences, but their meanings will be apparent to those skilled in the art. The term "balanced flow" is used consistently with the definition well-known in the art, whereby the molten material flows in directions defining flow vectors according to mass of molten material, and the flow vectors of all molten material add up to zero or as near to zero as technically feasible. Balanced flow may be accomplished, for example, by engineering symmetry into the first molding face 220, into the arrangement of cavity zones 230 on the first molding face 220, into the arrangement of cavity positions 240 in each cavity zone 230, or into combinations of any of these.

The first example scalable cavitation system configuration 201 further comprises a core plate 250 having defined on a second molding face 260 thereof a plurality of core positions 270. As with the cavity positions 240 on the cavity plate 210, each core position 270 is interchangeably configurable as either a functional core position 272 (represented as clear ovals) or as a non-functional core position 274 (represented as hatched ovals). The core positions 270 are configured to produce an operative pair of molding plates consisting of the cavity plate 210 and the core plate 250. The relationship between cavity positions 240 and core positions 270, between functional cavity positions 242 and functional core positions 272, and between non-functional cavity positions 244 and non-functional core positions 274 each may be described as a one-to-one correspondence. As used herein, the term "one-to-one-correspondence" means that every member of a first group of positions aligns with exactly one member of a second group of positions and that every member of the second group of positions aligns with exactly one member of the first group of positions. Thus, the core positions 270 are arranged such that, when the molding press is closed: the first molding face 220 directly contacts at least a portion of the second molding face 260; each cavity position 240 aligns with an opposing core position 270; each core position 270 aligns with an opposing cavity position 240; each non-functional cavity position 244 aligns with an opposing non-functional core position 274; and each functional cavity position 242 aligns with an opposing functional core position 272. Thus, between all respective pairs of positions consisting of one functional cavity position 242 and one functional core position 272, an individual mold cavity is formed that is capable of producing molding a part during a molding cycle.

The first example scalable cavitation system configuration 201 comprises a plurality of interchangeable multi-gate feed systems 280. Exactly one interchangeable multi-gate feed system 280 is disposed in each operational cavity zone 230A (and 230C) having at least one functional cavity position 242 therein. Thus, if no cavity positions 240 in an inoperative cavity zone 230B are configured as functional cavity positions 242 (i.e., if all cavity positions 240 in the inoperative cavity zone 230B are configured as non-functional cavity positions 244), an interchangeable multi-gate feed system may be present, but need not be present (as shown in FIG. 7), in the given inoperative cavity zone 230B. Preferably, the number of interchangeable multi-gate feed systems 280 is equal to the number of cavity zones 230 defined on the first molding face 220. The cavity zone 230 in which any given interchangeable multi-gate feed system 280 is disposed shall be referred to herein as the "associated cavity zone 230C" of the given interchangeable multi-gate feed system 280.

Each interchangeable multi-gate feed system 280 may comprise a feed-system body 290 and a number of individual feed gates 282 in fluid communication with the feed-system body and equal to or greater than the number of functional cavity positions of the associated cavity zone 230C, up to the total number of cavity positions 240 within the associated cavity zone 230C. In the non-limiting example of FIG. 7, the interchangeable multi-gate feed system is shown with four individual feed gates 282, equal in number to the cavity positions 240 in the associated cavity zone 230C. In this case, alternatively the interchangeable multi-gate feed system could be replaced with a substitute feed system having three individual feed gates 282 (i.e., the number of functional cavity positions 242 in the associated cavity zone 230C), but not with a substitute feed system having fewer than three or greater than four individual feed gates 282. Each functional cavity position 242 of the associated cavity zone 230C is coupled to exactly one of the individual feed gates 282. Conversely, each individual feed gate 282 is coupled to exactly one functional cavity position 242 of the associated cavity zone 230C. In this sense, "coupled" means that a physical connection is present during operation of the molding press, but that fluid communication is not necessarily established. It is contemplated that during a molding cycle a fluid communication may be intentionally broken or disrupted between the individual feed gate 282 and its functional cavity position 242, for example, by actuating means intended to allow the functional cavity position 242 to be temporarily disabled. It may be desirable to temporarily disable a functional cavity position 242, for example, to avoid wasting raw material when the mold components inserted into the functional cavity position 242 are somehow defective but are not replaced so as to maintain balance in the system or so as to avoid downtime necessary to accomplish maintenance. Likewise, the fluid communication can be disrupted unintentionally, such as by a clog.

Figure 8:
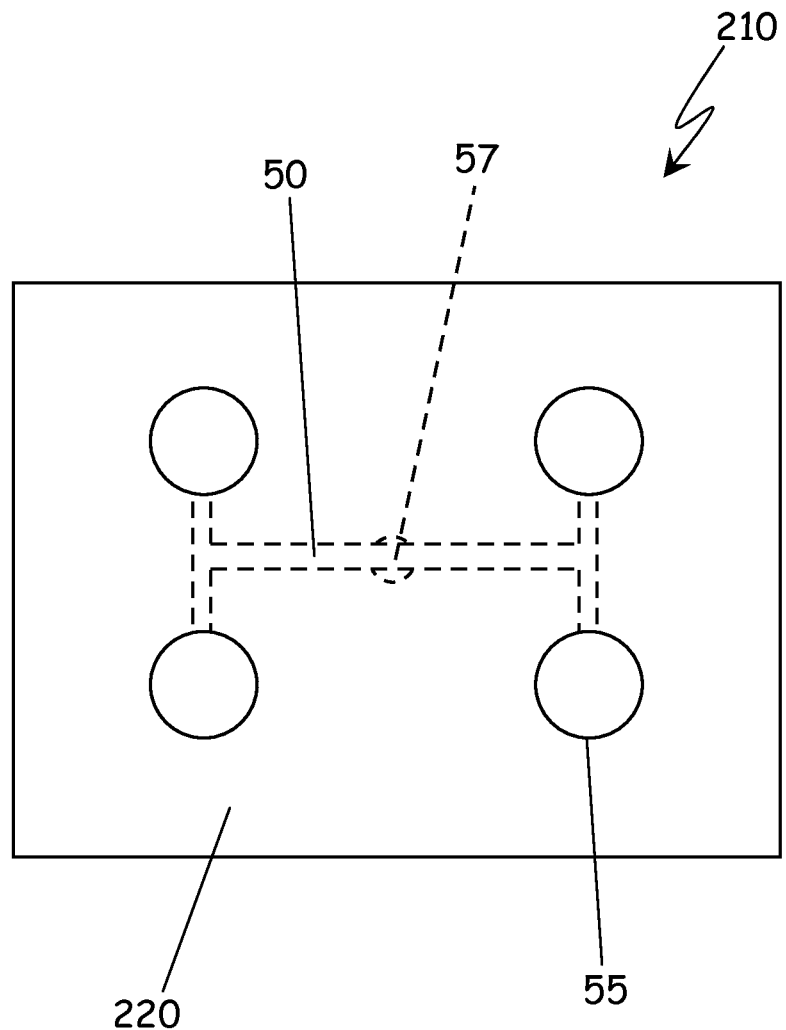
FIG. 8 is a top view of a molding face component of a scalable cavitiation system according to embodiments described herein.
Figure 9:
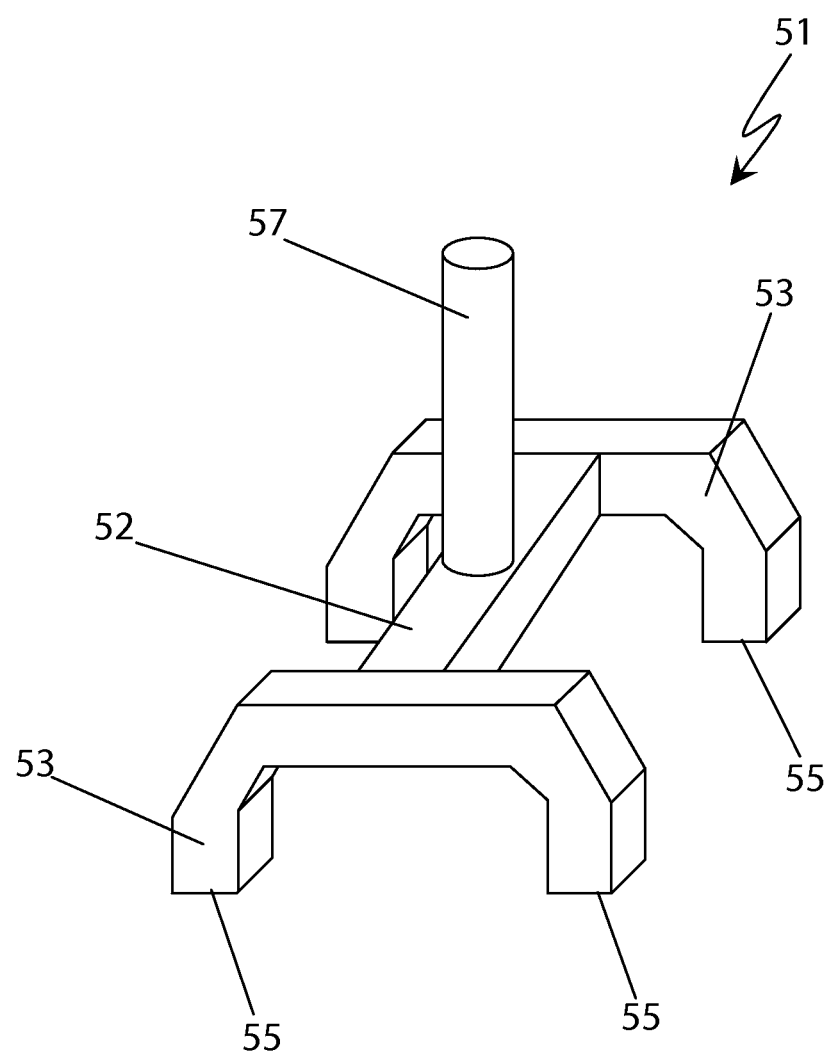
FIG. 9 is a perspective view of an example manifold configuration corresponding to the molding face component shown in FIG. 8.

Each interchangeable multi-gate feed system 280 is in fluid communication with the manifold 50 (see FIG. 1) through a primary drop 55 (see FIGS. 8 and 9) and uniquely designated to exactly one associated cavity zone 230C selected from the at least two cavity zones 230 (FIG. 7). Referring with particularity to FIG. 8, the cavity plate 210 is shown with the first molding face 220 exposed but without any of the cavity zones 230, cavity positions 240, or interchangeable multi-gate feed systems 280 present. A primary drop 55 is defined in the cavity plate 210 as the points of fluid communication between the first molding face 220 and the manifold 50 (shown as broken lines) on the manifold-facing side of the cavity plate 210 opposite the first molding face 220. Injection unit coupling 57, representing the point of fluid communication between the manifold 50 and the injection unit 45 (FIG. 1) is shown in broken lines also.

Each manifold 50 is designed according to the number and positions of primary drops 55. A corresponding manifold 51 tailored to fit the first molding face 220 is shown as a non-limiting example in FIG. 9. The corresponding manifold comprises an injection unit coupling 57 that transports molten material from the injection unit 45 (FIG. 1) into the transverse manifold section 52, where the molten material begins to flow in two opposite directions. The transverse manifold section 52 empties into manifold arm sections 53, which further split the flow of molten material into two flow paths each. The molten material then flows out of the corresponding manifold 51 through each of the four primary drops 55. Each primary drop 55 is fluidly coupled to exactly one interchangeable multi-gate feed system 280. It will be understood that design of injection molding manifolds is a complex engineering task and that numerous configurations of manifolds are possible, even for a simple configuration such as in the first molding face 220 used here as an example. The actual configuration of the manifold 50 is by no means critical. Rather, the only requirement of the manifold 50 is that it be fluidly connected to a number of interchangeable multi-gate feed systems 280 through an equal number of primary drops 55.

Figure 10:
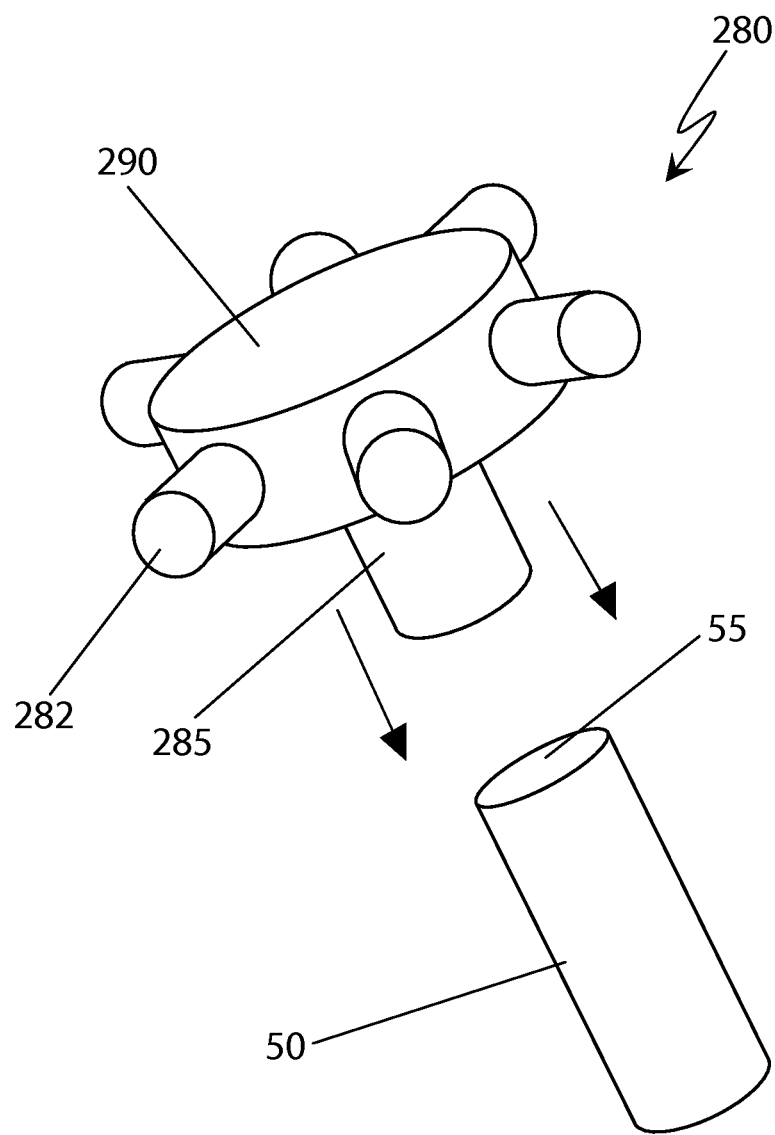
FIG. 10 is a configurational view of the connectivity between an example interchangeable multi-gate feed system and a primary drop of a manifold according to embodiments described herein.

The fluid communication of the interchangeable multi-gate feed system 280 is depicted generally in FIG. 10. The interchangeable multi-gate feed system 280 shown in FIG. 10 is intended to illustrate physical interrelationships only and is not intended to limit the interchangeable multi-gate feed system 280 to any particular configuration shown. In some embodiments, the interchangeable multi-gate feed system 280 may comprise a feed-system body 290 and a manifold coupling 285 that is operable to be coupled to the manifold 50 at the primary drop 55. For example, the manifold coupling 285 may be slidably insertable into the primary drop 55 or may have a larger inside diameter than that of the primary drop 55 so that the primary drop 55 is slidably insertable into the manifold coupling 285. Alternatively, the manifold coupling 285 and the primary drop 55 may have suitably placed threaded connections (not shown) for accomplishing a secure mounting. Regardless, the term "interchangeable" with respect to the interchangeable multi-gate feed system 280 requires that the physical connection between the manifold coupling 285 and the primary drop 55 not be permanent and, preferably, that the connection be simple to disconnect and reconnect. The individual feed gates 282 are in fluid communication with the feed-system body and are depicted generically in FIG. 10. The individual feed gates 282 may be any type of feed gate known in the art including, but not limited to, thermal gates, valve gates, edge gates, and any gate suitable to be coupled with the interchangeable multi-gate feed system 280 employed in the scalable cavitation system.

The interchangeable multi-gate feed system 280 in the scalable cavitation system may have any number of configurations. In some embodiments, the interchangeable multi-gate feed system 280 may be configured as a removable unit within an established set of cavity zones 230 on the first molding face 220. In other embodiments, the interchangeable multi-gate feed system may be integrated with a cavity zone plate, such that the cavity zone represented by the cavity zone plate becomes a fully modular assembly. Modular assemblies permit changes not only with respect to the number of parts that can be produced by one molding face pair, but also to the type of parts that can be produced by one molding face pair. Applicable strategies with regard to modular assemblies have been disclosed in United States Pat. Appl. Pub. No. 2008/0003321, assigned to The Procter & Gamble Company, which publication is hereby incorporated by reference in its entirety into the present application.

Figure 11A:
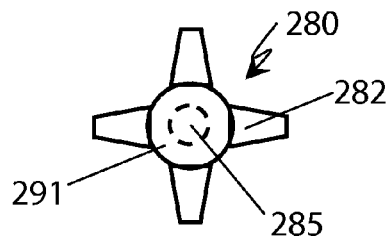
FIG. 11A is an example configuration of an interchangeable multi-gate feed system according to embodiments described herein.
Figure 11B:
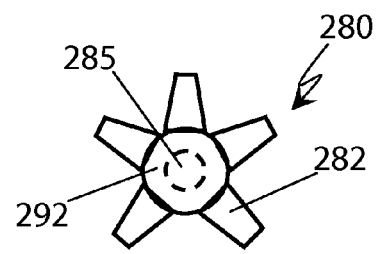
FIG. 11B is an example configuration of an interchangeable multi-gate feed system according to embodiments described herein.
Figure 11C:
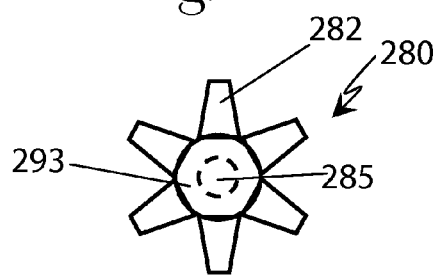
FIG. 11C is an example configuration of an interchangeable multi-gate feed system according to embodiments described herein.
Figure 11D:
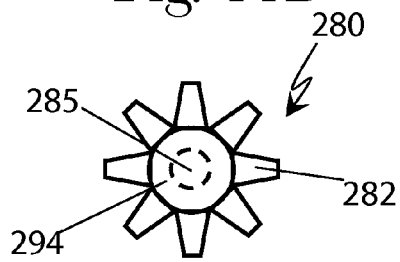
FIG. 11D is an example configuration of an interchangeable multi-gate feed system according to embodiments described herein.
Figure 11E:
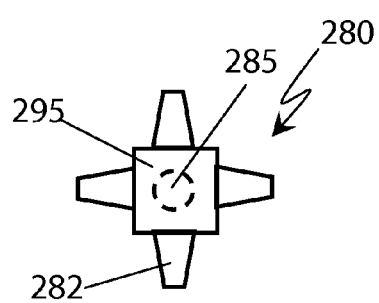
FIG. 11E is an example configuration of an interchangeable multi-gate feed system according to embodiments described herein.
Figure 11F:
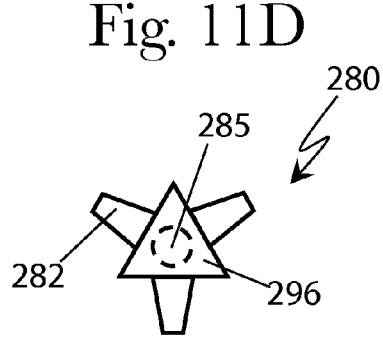
FIG. 11F is an example configuration of an interchangeable multi-gate feed system according to embodiments described herein.
Figure 11G:
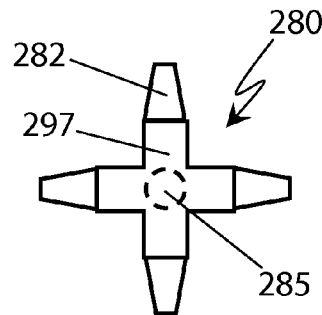
FIG. 11G is an example configuration of an interchangeable multi-gate feed system according to embodiments described herein.
Figure 11H:
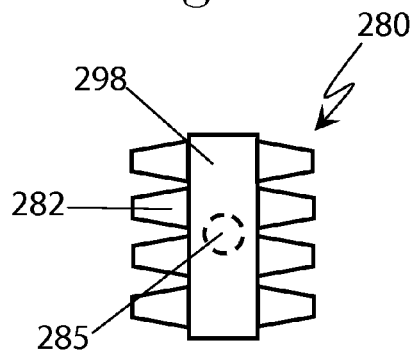
FIG. 11H is an example configuration of an interchangeable multi-gate feed system according to embodiments described herein.

Non-limiting example configurations of interchangeable multi-gate feed systems 280 that are removable units are presented in FIGS. 11A-11H. Each of the interchangeable multi-gate feed systems 280 comprises a number of individual feed gates 282 and a manifold coupling 285 (shown in broken lines) below a feed-system body. The feed-system body may be radial, such that all individual feed gates 282 extend outwardly from a center point of the feed-system body, or the feed-system body may be non-radial, such that at least one, or even all, individual feed gates 282 do not extend outwardly from such a center point. FIGS. 11A-11G illustrate example radial feed system bodies, and FIG. 11H illustrates an example non-radial feed system body.

As a non-limiting example of a radial feed-system body, the interchangeable multi-gate feed system 280 shown in FIG. 11A comprises a four-gate circular feed-system body 291. As a further non-limiting example of a radial feed-system body, the interchangeable multi-gate feed system 280 shown in FIG. 11B comprises a five-gate circular feed-system body 292. As a further non-limiting example of a radial feed-system body, the interchangeable multi-gate feed system 280 shown in FIG. 11C comprises a six-gate circular feed-system body 293. As a further non-limiting example of a radial feed-system body, the interchangeable multi-gate feed system 280 shown in FIG. 11D comprises an eight-gate circular feed-system body 294.

Radial feed system bodies need not be circular or even round. As a non-limiting example of a non-circular radial feed-system body, the interchangeable multi-gate feed system 280 shown in FIG. 11E comprises a four-gate square feed-system body 295. As a further non-limiting example of a non-circular radial feed-system body, the interchangeable multi-gate feed system 280 shown in FIG. 11F comprises a three-gate triangular feed-system body 296. As a further non-limiting example of a non-circular radial feed-system body, the interchangeable multi-gate feed system 280 shown in FIG. 11G comprises a four-gate cross-shaped feed-system body 297.

As a non-limiting example of a non-radial feed-system body, the interchangeable multi-gate feed system 280 shown in FIG. 11H comprises an eight-gate dual-side rectangular feed-system body 298. In the eight-gate dual-side rectangular feed-system body 298, the individual feed gates 282 are pointed in only two opposing directions, in contrast to the other examples in FIGS. 11A-11G where the individual feed gates all are pointed outwardly from the center of the manifold coupling 285.

Figure 12:
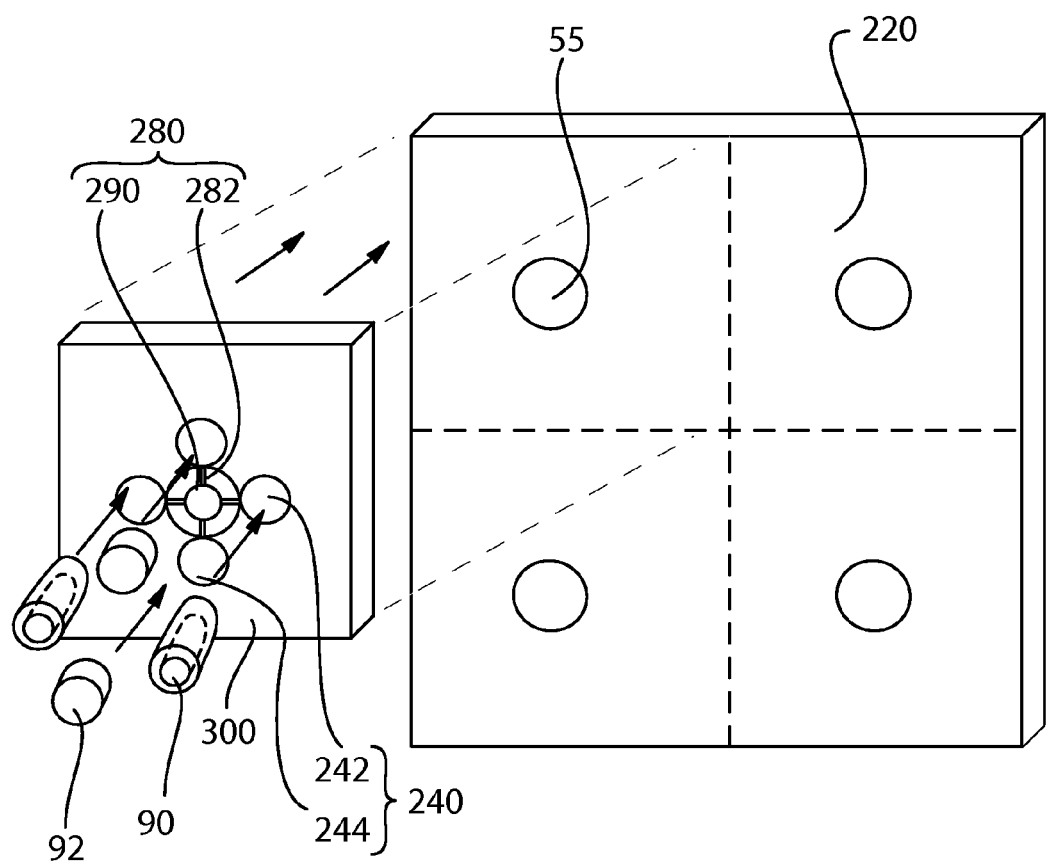
FIG. 12 is an exploded view of interconnectivities between a modular cavity zone assembly and a molding face according to embodiments described herein.

Referring to FIG. 12, an exploded view of a modular cavity-zone plate 300 is shown. The modular cavity-zone plate 300 integrates the cavity positions 240 and the interchangeable multi-gate feed system 280, of which the feed-system body 290 and the individual feed gates 282 are visible. The interchangeable multi-gate feed system 280 may be configured in any suitable manner, such as in the examples described above in FIGS. 11A-11H, with the number of cavity positions 240 shown in FIG. 12 by way of illustration, not of limitation. Alternatively, the interchangeable multi-gate feed system may be configured as any internal manifold system known or to be developed, whereby a feed-system body 290 is not required, but rather various conduits are employed to split the flow of molten material into as many streams as there are functional cavity positions. The modular cavity-zone plate 300 is shown being coupled to the primary drop 55 in the first molding face 220. The first molding face 220 as depicted accommodates four of the modular cavity-zone plates 300. Even so, this is by way of illustration and not limitation. The first molding face 220 could be configured to accommodate any number of modular cavity-zone plates 300 from two to twenty, from two to twenty-four, from two to thirty, or even from two to greater than twenty, such as from two to one hundred, as technically feasible. Also depicted in FIG. 12 is the insertion of cavity insert 90 into a cavity position 240 to configure the cavity position 240 as a functional cavity position 242. Similarly, a blank insert 92 is inserted in a cavity position 240 to configure the cavity position 240 as a non-functional cavity position 244. The shape of the cavity insert 90 and the shapes of the cavity positions 240 themselves are depicted as illustrations only, not by way of limitation.

Figure 13:
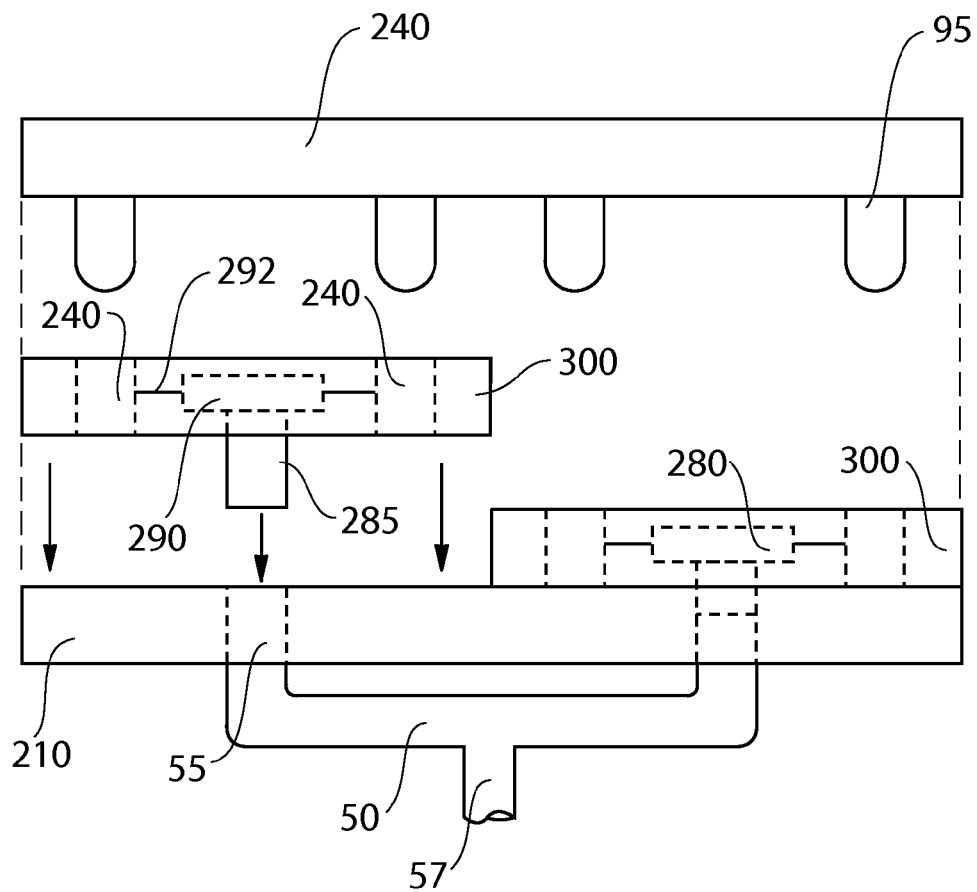
FIG. 13 is a plan view of interconnectivities of two individual cavity zones of a scalable cavitation system according to embodiments described herein.

FIG. 13 shows a plan view of the same basic interrelationships shown in FIG. 12. Here, modular cavity-zone plates 300 are seated into the cavity plate 210. The interchangeable multi-gate feed systems 280, comprising the feed-system body 290 and individual feed gates 292 are shown inside the modular cavity-zone plates 300. The manifold coupling 285 is coupled to the primary drop 55 of the manifold 50 by simple insertion. The injection unit coupling 57 of the manifold 50 is shown at the bottom of the manifold 50. The core plate 250 is shown fitted with core inserts 95 that correspond to the cavity positions 240 in each of the modular cavity-zone plates 300.

As noted above, in the scalable cavitation system 200 the positions of the cavity positions 240 and interchangeable multi-gate feed systems 280 are virtually limitless. Four specific but non-limiting examples of such configurations are shown in FIGS. 14-17.

Figure 14:
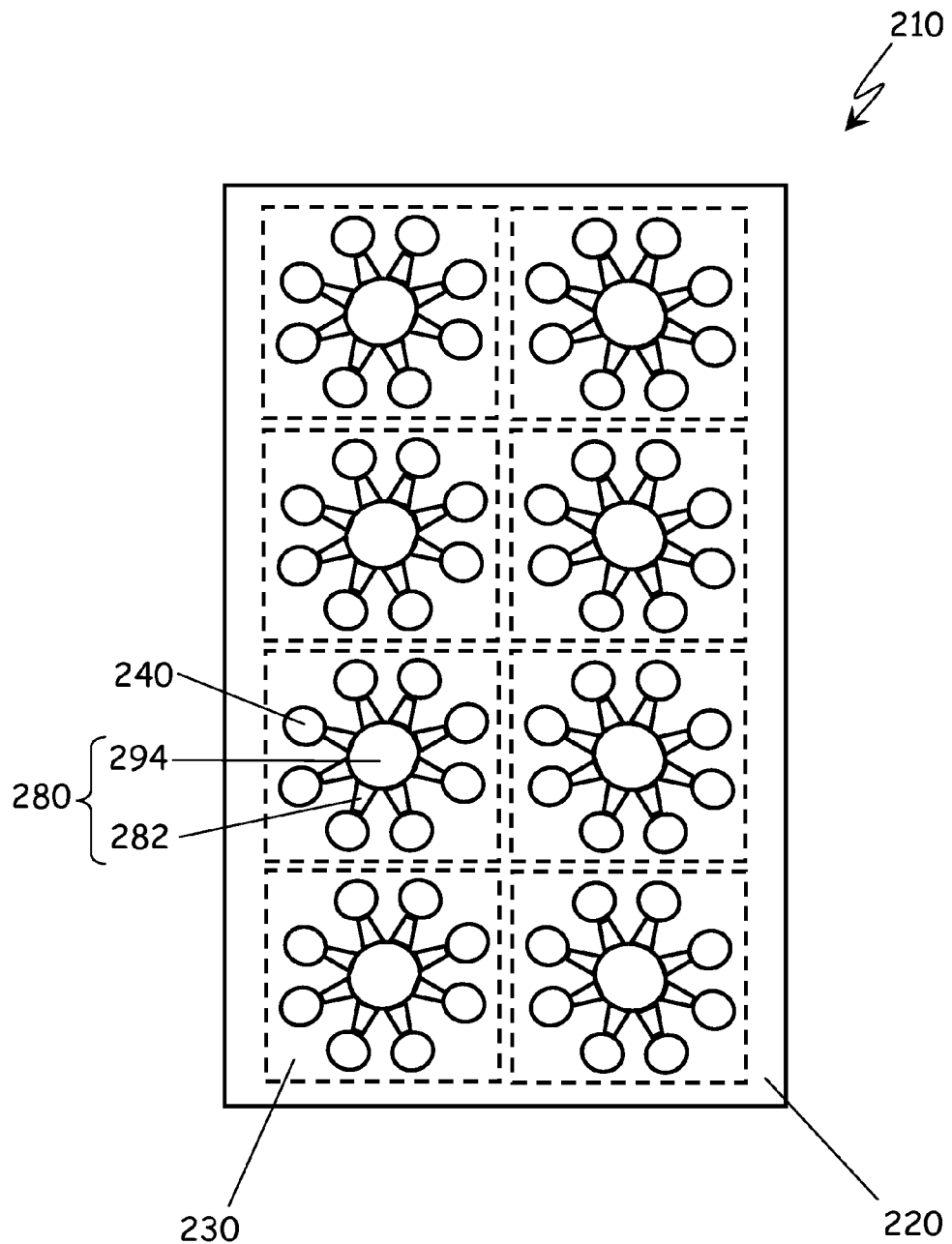
FIG. 14 depicts an example configuration of cavity positions on a cavity face of a scalable cavitation system according to embodiments described herein.

The cavity plate 210 shown as an example embodiment in FIG. 14 has a first molding face 220 with eight cavity zones 230. Each cavity zone 230 is defined on the first molding face 220 but may be either integral with the first molding face 220 or mounted onto the first molding face 220, such as through a modular cavity-zone plate described above. Each cavity zone 230 is fitted with an interchangeable multi-gate feed system 280 comprising eight individual feed gates 282 attached to an eight-gate circular feed-system body 294.

Figure 15:
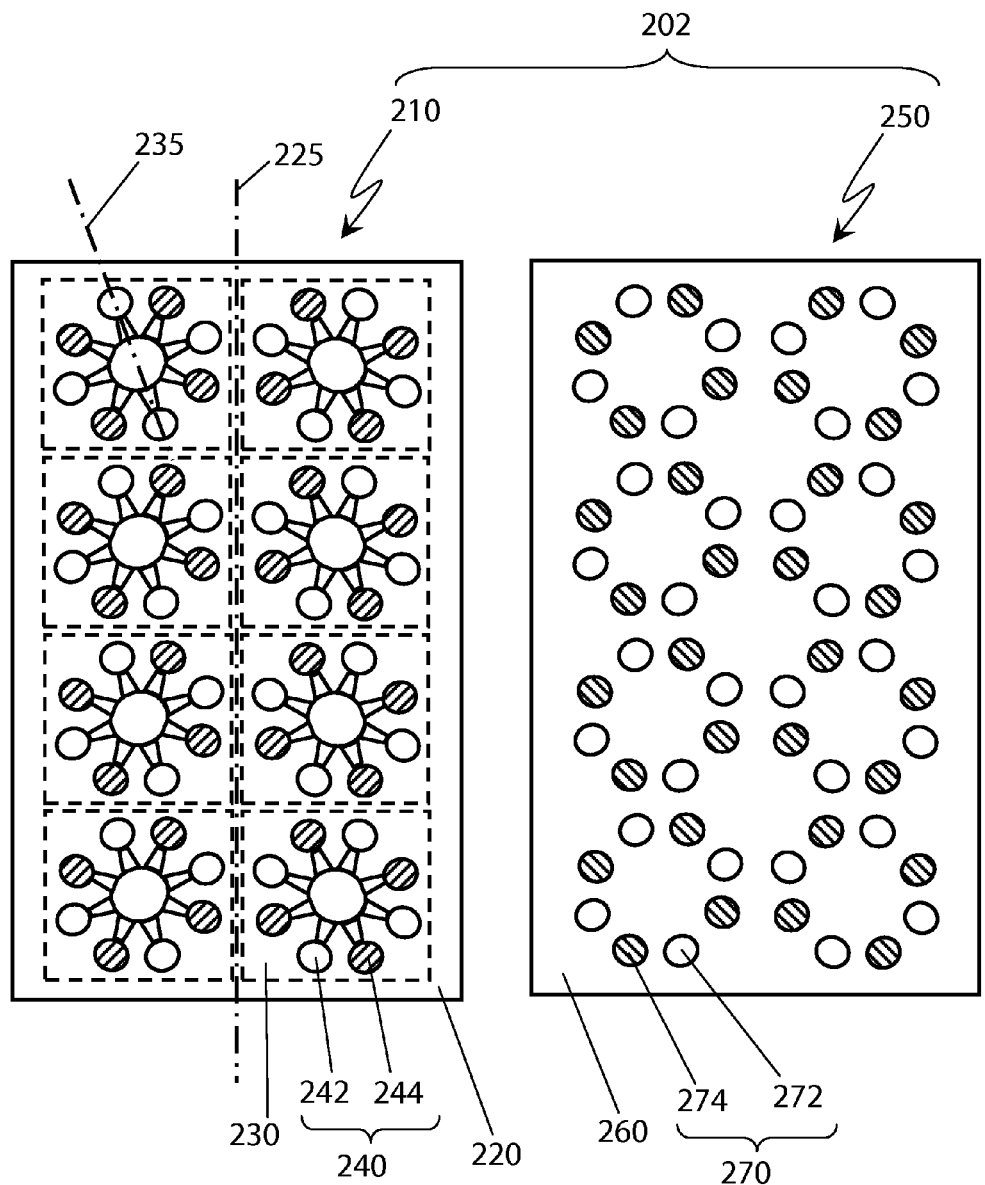
FIG. 15 depicts an example configuration of cavity and core positions on a molding face pair as part of a scalable cavitation system according to embodiments described herein.

Referring to FIG. 15, the cavity plate 210 from FIG. 14 is reproduced and shown as part of a second example scalable cavitation system configuration 202 including the core plate 250. Here, exactly four cavity positions 240 in each cavity zone 230 are configured as functional cavity positions 242 and exactly four cavity positions 240 in each cavity zone 230 are configured as non-functional cavity positions 244. The core positions 270 are configured correspondingly as functional core positions 272 and non-functional core positions 274. Thus, when the first molding face 220 is pressed against the second molding face 260, each cavity position 240 aligns with an opposing core position 270, each core position 270 aligns with an opposing cavity position 240; each non-functional cavity position 244 aligns with an opposing non-functional core position 274; and each functional cavity position 242 aligns with an opposing functional core position 272 so as to define a mold cavity between the functional cavity position 242 and the opposing functional core position 272. Moreover, in this example, identical numbers of functional cavity positions 242 are present in each cavity zone 230. Further, in this example, the functional cavity positions 242 are situated such that balanced flow is established both in each cavity zone 230 and across the entire surface of the first molding face 220. Balanced flow in each cavity zone 230 is evident from the zone-symmetry axis 235, and balanced flow across the first molding face is evident from the face-symmetry axis 225.

The second example scalable cavitation system configuration 202 may be used to illustrate the aspect of scalability of scalable cavitation systems in general. The cavity plate 210 of the second example scalable cavitation system configuration 202, for example, is shown with eight cavity zones 230 each having eight cavity positions 240, for a maximum cavitation of 8×8=64. It will be understood that the six-by-eight matrix is only one example. In alternative examples not shown, the cavity plate may have considerably more cavity zones and as many cavity positions as can fit in each cavity zone such as for example, 20 cavity zones each with four cavity positions (maximum cavitation of 80), 10 cavity zones each with twelve cavity positions (maximum cavitation of 120), or even 20 cavity zones each with 20 cavity positions (maximum cavitation of 400).

But referring back to the second example scalable cavitation system configuration 202, because each cavity position 240 is independently and interchangeably configurable, in theory any number of parts from 1 to 48 may be produced using the cavity plate 210 and the core plate 250 of the second example scalable cavitation system configuration 202. In practice, however, to promote a balanced flow it may be preferable to configure the cavity positions 240 such that each cavity zone 230 has an identical number of functional cavity positions 242. As such, the operative cavitation of the second example scalable cavitation system configuration 202 in preferred embodiments may be scaled as integral multiples of the number of cavity zones 230, from 1 to the number of individual feed gates 282 on each interchangeable multi-gate feed system 280. For the second example scalable cavitation system configuration 202, this provides options for operative cavitations of 8, 16, 24, 32, 40, and 48, 56, and 64 with an operative cavitation of 32 being shown in FIG. 15.

The ability to scale a scalable cavitation system in this manner may impart value to the scalable injection molding system because the tooling of cavity inserts and core inserts may represent up to 60% of the cost of fabricating mold plates. This includes raw materials and labor, with labor in many instances being the larger investment. One the one hand, an investment in a scalable injection molding system with scalable cavitation system having a maximum cavitation such as 48 may initially represent a greater cost than simply buying a prior-art 24-cavity mold and waiting until need for production increases. On the other hand, with the scalable cavitation system it is unnecessary to purchase sufficient cavity inserts and core inserts until they are needed, and once production needs do double to require the output of a 48-cavity mold, it will be unnecessary to waste capital budget allocations on duplicated standard parts such as a new molding press. Moreover, the reconfiguration of the second example scalable cavitation system configuration 202 from an operative cavitation of 24 to an operative cavitation of 48 is significantly faster, even if a new set of 24 cavity inserts is required, than ordering and optimizing a complete new injection molding system.

Figure 16:
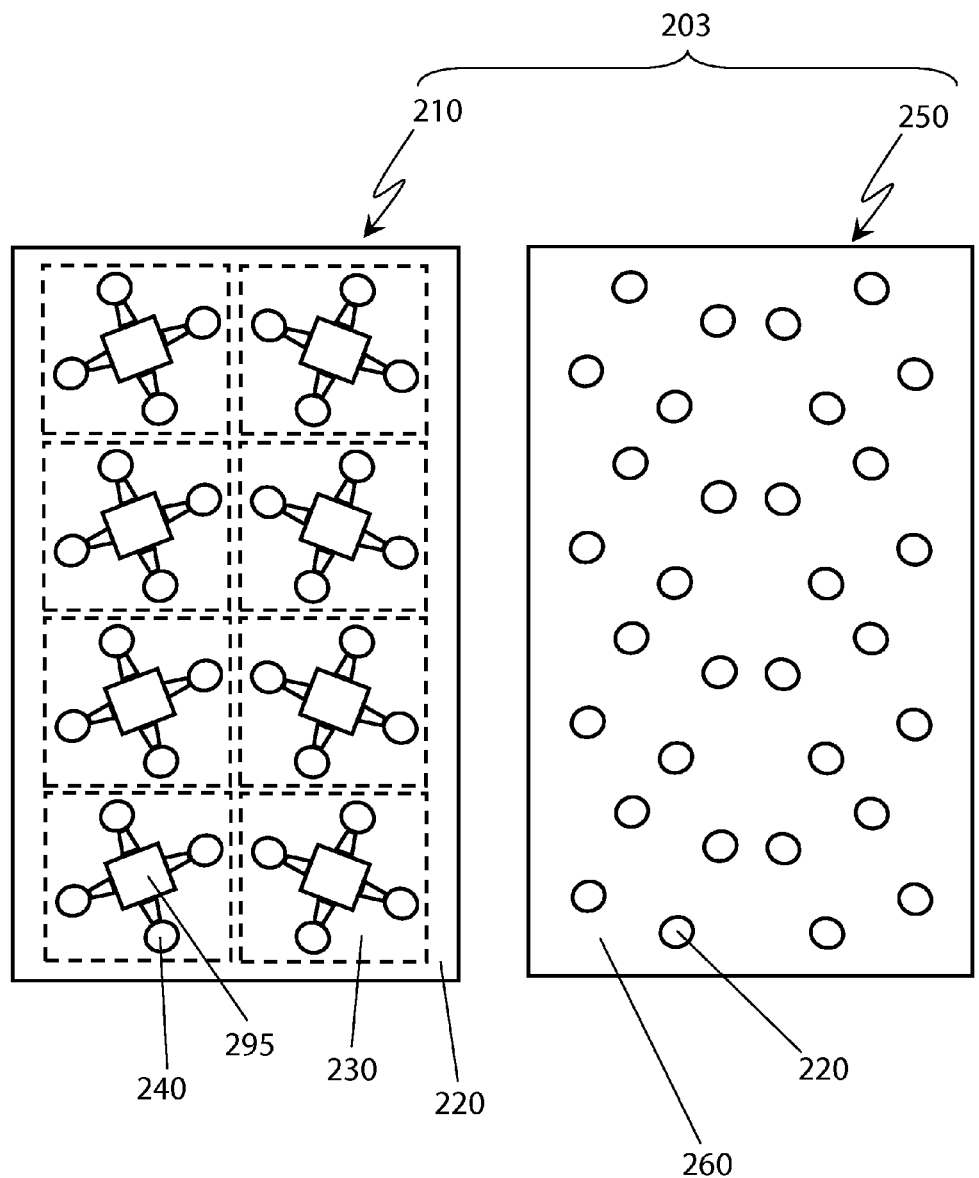
FIG. 16 depicts an example configuration of cavity and core positions on a molding face pair as part of a scalable cavitation system according to embodiments described herein.
Figure 17:
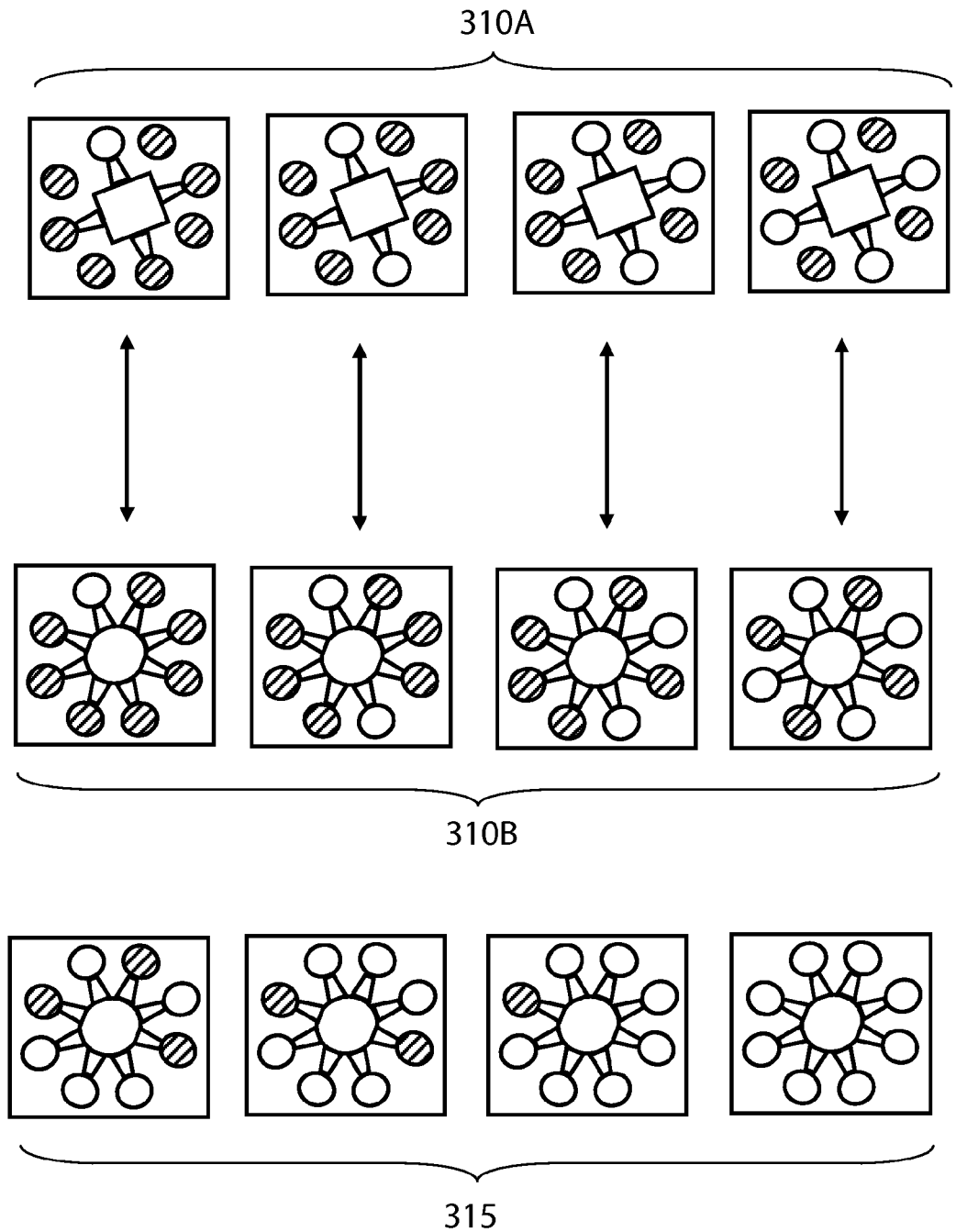
FIG. 17 depicts the interchangeability of two example configurations of interchangeable multi-gate feed systems according to embodiments described herein.

Referring to FIG. 16, a third example scalable cavitation system configuration 203 is depicted. Here, each cavity zone 230 on the first molding face 220 has four cavity positions. Each interchangeable multi-gate feed system comprises a four-gate square-shaped feed-system body 295, and the maximum cavitation is 32. The four-gate square-shaped feed-system body 295 illustrates a further versatility of the scalable cavitation systems in general. Not coincidentally, the positions of the individual feed gates in a four-gate square-shaped feed-system body 295 shown in FIG. 16 and FIG. 11E may align precisely with exactly four of the eight individual feed gates 282 of the eight-gate circular feed-system body 294 shown in FIG. 14 and FIG. 11D. This relationship is further explored with reference to FIG. 17. Thus, the four-gate square-shaped feed-system body 295 may operate with one, two, three, or four operational feed gates, such as in any of the four-gate cavitations 310A, but not limited to only the particular arrangements shown. Geometrically, each of the four-gate cavitations 310A is equivalent to one of the equivalent eight-gate cavitations 310B. Naturally, the eight-gate system also can operate in one of the high-capacity eight-gate cavitations 315 while the four-gate system cannot. Thus, in a scalable cavitation system having cavity positions arranged accordingly, cavitation can be scaled not only by deactivating certain cavity positions but also by simply exchanging a first interchangeable multi-feed gate feed system having a first number of individual cavity positions for a second interchangeable multi-feed gate feed system having a second number of individual cavity positions different from the first number but having a corresponding geometric relationship such as the one illustrated in FIG. 17.

Figure 18:
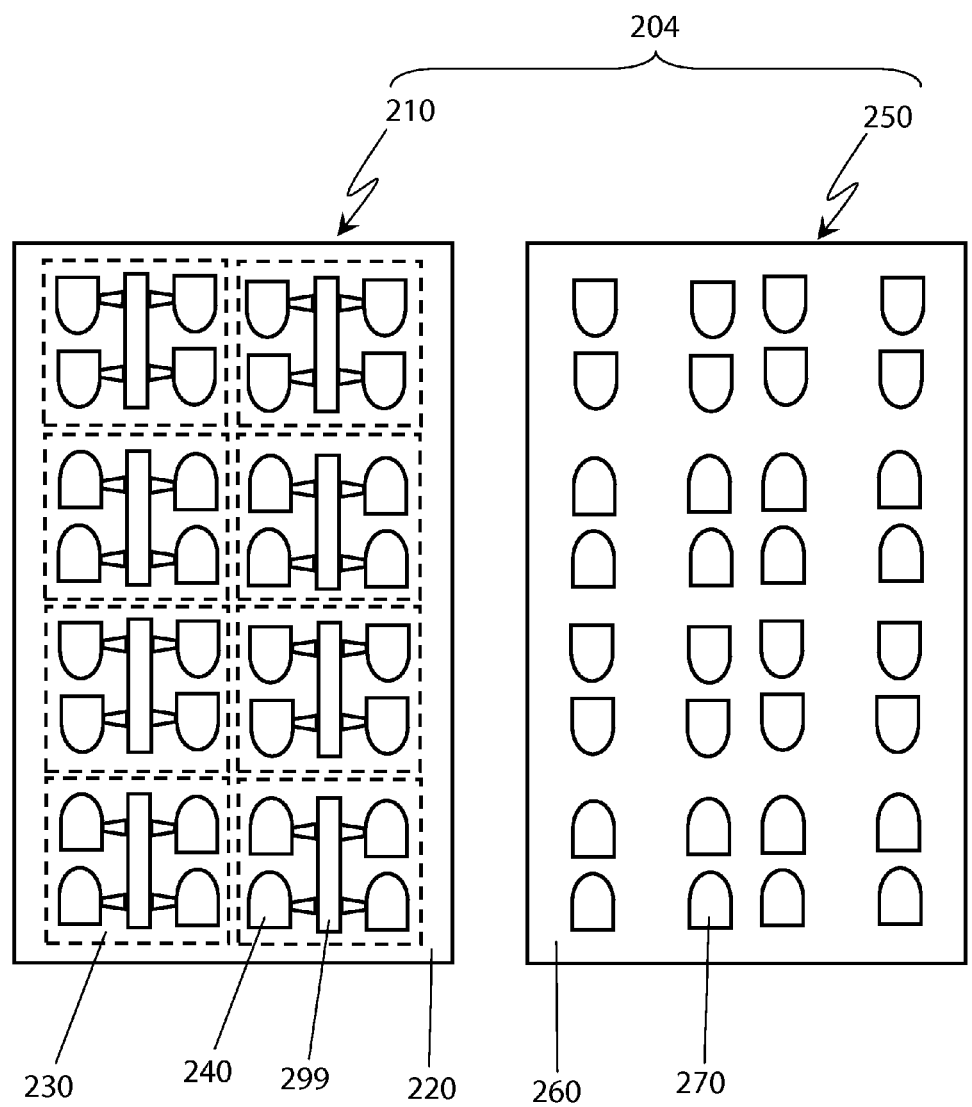
FIG. 18 depicts an example configuration of cavity and core positions on a molding face pair as part of a scalable cavitation system according to embodiments described herein.

Referring now to FIG. 18, a fourth example scalable cavitation system configuration 204 is depicted. Here, each cavity zone 230 has four cavity positions, for a maximum cavitation of 32 in the fourth example scalable cavitation system configuration 204. The cavity positions 240 and core positions 270 are shown as a different shape from other example embodiments, without intent to limit to such a shape or to the circles shown in other examples. The cavity positions are fed with molten material through feed systems comprising a four-gate dual-side rectangular feed-system body 299.

Any of the scalable cavitation systems described above can be incorporated into a scalable injection molding system already having in place a scalable face-number system. For example, a scalable face-number system may be operable in four configurations including a single-face configuration, two double-face configurations, and four-face configuration, where each pair of molding faces has a maximum cavitation of thirty-two. A scalable cavitation system may be configured into the scalable face-number system through the A-side molding face, the B-side molding face, or both. Take, for example, a scalable cavitation system with eight cavity zones, each cavity zone having four cavity positions.

If, for simplicity, not by way of limitation, the number of functional cavity positions is the same in each cavity zone, the scalable cavitation on each pair of molding faces may be operable with cavitations of 8, 16, 24, or 32. If exactly one such scalable cavitation system is employed on only the A-side molding face, the injection molding system would have options including: in a one-face system, operable cavitations during each molding cycle of 8, 16, 24, or 32; or in a two-face or four-face system, operable cavitations during each cycle of 40, 48, 56, or 64. In this scalable injection molding system, the speed of the operation, and hence, the output per unit time, may be increased or decreased depending on whether the rotatable intermediate assembly is oscillated or held stationary.

If scalable cavitation systems are employed on both the A-side molding face and the B-side molding face in the scalable injection molding system with the scalable face-number system, during each molding cycle the scalable injection molding system would have options including: in a one-face system, operable cavitations of 8, 16, 24, or 32; or in a two-face or a four-face system, 8, 16, 24, 32, 50, 48, 56, or 64. Also in this scalable injection molding system, the speed of the operation, and hence, the output per unit time, may be increased or decreased depending on whether the rotatable intermediate assembly is oscillated or held stationary. As such, the operator will have fully utilized the two dimensions of scalability. With an initial investment in standard components and only eight cavity and core inserts, this system can be scaled up by the operator to eight times its original output by purchasing only the additional core and cavity inserts needed to fill the cavity positions that were designated originally as non-functional.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A scalable injection molding system comprising:
a molding press having an A-side wall on an A-side of the molding press and a B-side wall on a B-side of the molding press, the B-side opposite the A-side;
at least one delivery system comprising an injection unit coupled to the molding press, the injection unit operable to deliver molten material to a manifold in fluid communication with the injection unit;
at least one molding face pair comprising a cavity face and an opposing core face; and
a scalable cavitation system;
wherein the scalable cavitation system comprises:
a cavity plate having defined on a first molding face thereof at least two non-overlapping cavity zones, each cavity zone having defined therein a plurality of cavity positions, each cavity position being independently and interchangeably configurable as a functional cavity position or as a non-functional cavity position, at least one cavity position on the first molding face being configured as a functional cavity position;
a core plate having defined on a second molding face thereof a plurality of core positions, each core position being interchangeably configurable as a functional core position or as a non-functional core position, the core positions configured such that, when the molding press is closed:
the first molding face directly contacts at least a portion of the second molding face;
a one-to-one correspondence exists between the cavity positions and the core positions, between the functional cavity positions and the functional core positions, and between the non-functional cavity positions and the non-functional core positions; and
a mold cavity is defined between each functional cavity position and an opposing functional core position; and
a plurality of interchangeable multi-gate feed systems, wherein:
one interchangeable multi-gate feed system is disposed in each cavity zone having at least one functional cavity position therein;
each interchangeable multi-gate feed system is in fluid communication with the manifold through a primary drop;
each interchangeable multi-gate feed system is uniquely designated to exactly one associated cavity zone selected from the at least two cavity zones;
each interchangeable multi-gate feed system comprises a number of individual feed gates equal to or greater than the number of functional cavity positions of the associated cavity zone, up to the total number of cavity positions of the associated cavity zone;
each functional cavity position of the associated cavity zone is coupled to exactly one of the individual feed gates.

2. The scalable injection molding system of claim 1, wherein the at least one delivery system comprises:
- an A-side delivery system coupled to the A-side wall and having an A-side injection unit in fluid communication with an A-side manifold; and
- a B-side delivery system coupled to a B-side wall and having a B-side injection unit in fluid communication with a B-side manifold, wherein the scalable injection molding system comprises a scalable face-number system.

3. The scalable injection molding system of claim 2, wherein the scalable injection molding system comprises a scalable face number system comprising:
- an A-side molding plate directly coupled to the A-side manifold and having an A-side molding face facing the B-side of the molding press;
- a B-side molding plate directly coupled to the B-side manifold and having a B-side molding face facing the A-side of the molding press;
- a rotatable intermediate assembly disposed between the A-side molding face and the B-side molding face, the rotatable intermediate assembly having at least two pairs of parallel molding faces, each pair of parallel molding faces comprising an A-side opposing molding face and a B-side opposing molding face, the scalable injection molding system comprising a single-side stationary-intermediate configuration, a dual-side stationary-intermediate configuration, a single-side oscillating-intermediate configuration, and a dual-side oscillating-intermediate configuration.

4. The scalable injection molding system of claim 3, wherein each rotatable intermediate assembly comprises exactly two pairs of opposing parallel faces, the exactly two pairs of opposing parallel faces defining exactly one active face pair and exactly one inactive face pair during each molding cycle.

5. The scalable injection molding system of claim 3, wherein the at least one intermediate assembly further comprises at least one two-face intermediate assembly disposed between the A-side molding face and the rotatable intermediate assembly or between the B-side molding face and the rotatable intermediate assembly.

6. The scalable injection molding system of claim 3, wherein the at least one intermediate assembly further comprises a second rotatable intermediate assembly disposed between the rotatable intermediate assembly and the A-side molding face.

7. The scalable injection molding system of claim 3, wherein the at least one scalable system further comprises further comprises a first scalable cavitation system in fluid communication with the first manifold and a second scalable cavitation system in fluid communication with the second manifold.

8. The scalable injection molding system of claim 1, wherein:
- each functional cavity position is coupled to a cavity insert, the cavity insert being in fluid communication with the manifold;
- each functional core position is coupled to a core insert, the core insert being in fluid communication with the manifold;
- each non-functional cavity position is selected from the group consisting of a blank plate, a rubber block, an air gap, and a cavity insert not in fluid communication with the manifold; and
- each non-functional core position is selected from the group consisting of a blank plate, a rubber block, an air gap, and a core insert not in fluid communication with the manifold.

9. The scalable injection molding system of claim 1, wherein each cavity position is interchangeably configurable, except that an equal number of cavity positions in each cavity zone are configured as functional cavity positions.

10. The scalable injection molding system of claim 1, wherein each cavity position is interchangeably configurable, except that the cavity positions in each cavity zone are configured to establish a balanced flow within the cavity zone.

11. The scalable injection molding system of claim 1, wherein each cavity zone defines a symmetry axis within the cavity zone, each cavity position being interchangeably configurable, except that exactly one half of the functional cavity positions in each individual cavity zone are disposed on each side of the symmetry axis.

12. The scalable injection molding system of claim 1, wherein the cavity plate defines at least four cavity zones.

13. The scalable injection molding system of claim 1, wherein each cavity zone comprises at least four cavity positions.

14. The scalable injection molding system of claim 1, further comprising at least one modular cavity-zone plate coupled to the cavity plate, each modular cavity-zone plate integrating one of the interchangeable multi-gate feed systems and one of the cavity zones as a modular assembly, the modular assembly being insertable into and removable from the scalable cavitation system as a single unit.

15. The scalable injection molding system of claim 1, wherein the cavity plate defines Z cavity zones, each of the Z cavity zones comprising an equal number C of cavity positions, each cavity position comprising an equal number F of functional cavity positions, where Z is an integer from 2 to 30, C is an integer from 2 to 12, and F is an integer from 1 to C, such that a number of mold cavities operable to produce molded parts during a single cycle of the scalable injection molding system is scalable as integral multiples of Z from 2 to C, without re-tooling or replacement of any standard components.

16. The scalable injection molding system of claim 1, wherein each individual feed gate is an actuatable feed gate independently and reversibly switchable between an ON state and an OFF state, such that the mold cavity coupled to the actuatable feed gate is in fluid communication with the actuatable feed gate in the ON state and is not in fluid communication with the actuatable feed gate in the OFF state.

17. A method for scaling an operative cavitation in a scalable injection molding system according to claim 1, the method comprising:
- reconfiguring at least a portion of the non-functional cavity positions in each cavity zone as functional cavity positions.

* * * * *